(12) United States Patent
Braun

(10) Patent No.: US 9,216,673 B2
(45) Date of Patent: Dec. 22, 2015

(54) LOW PROFILE SEAT POSITION ADJUSTMENT SYSTEM

(75) Inventor: Kenneth Braun, Mequon, WI (US)

(73) Assignee: Milsco Manufacturing Company, A Unit of Jason Incorporated, Milwaukee, WI (US)

( * ) Notice: Subject to any disclaimer, the term of this patent is extended or adjusted under 35 U.S.C. 154(b) by 467 days.

(21) Appl. No.: 13/599,338

(22) Filed: Aug. 30, 2012

(65) Prior Publication Data

US 2012/0318949 A1   Dec. 20, 2012

Related U.S. Application Data

(63) Continuation-in-part of application No. 13/493,494, filed on Jun. 11, 2012, now Pat. No. 8,632,043, which is a continuation of application No. 11/908,856, filed on Mar. 5, 2008, now Pat. No. 8,196,887.

(51) Int. Cl.

| | |
|---|---|
| *F16M 13/00* | (2006.01) |
| *B60N 2/38* | (2006.01) |
| *B60N 2/07* | (2006.01) |
| *B60N 2/08* | (2006.01) |
| *G10L 19/093* | (2013.01) |
| *B60N 2/015* | (2006.01) |

(Continued)

(52) U.S. Cl.
CPC .............. *B60N 2/38* (2013.01); *B60N 2/01575* (2013.01); *B60N 2/06* (2013.01); *B60N 2/07* (2013.01); *B60N 2/0702* (2013.01); *B60N 2/075* (2013.01); *B60N 2/085* (2013.01); *B60N 2/0825* (2013.01); *G10L 19/093* (2013.01)

(58) Field of Classification Search
USPC .................. 248/429, 424; 297/344.1, 344.11, 297/344.21, 344.24; 384/47, 26, 42; 296/65.13
See application file for complete search history.

(56) References Cited

U.S. PATENT DOCUMENTS 4,065,181 A * 12/1977 Gunlock et al. ......... 297/440.22
4,198,092 A *  4/1980 Federspiel ................. 296/65.02
(Continued)

FOREIGN PATENT DOCUMENTS

| DE | 9421432 | 1/1996 |
|---|---|---|
| DE | 9421432 | 2/1996 |
| DE | 10065311 | 7/2002 |

OTHER PUBLICATIONS

EP Communication Dated Jan. 28, 2015, in corresponding EP Application No. 06 739 499.9.

*Primary Examiner* — Terrell McKinnon
*Assistant Examiner* — Michael McDuffie
(74) *Attorney, Agent, or Firm* — Boyle Fredrickson S.C.

(57) ABSTRACT

A seat position adjustment assembly including an anchor plate from which a plurality of slide bearings extend slidably received in guide slots formed in a slide plate enabling seat position adjustment and which can also function as a seat mount. Each bearing includes a slide bearing having a slide plate receiving channel and a retainer engagement channel receiving a keeper disposed between the anchor and slide plates anchoring the slide bearing to the anchor plate. Each keeper releasably engages the slide bearing, can straddle the bearing, can function as a spacer spacing the slide plate from the anchor plate, and can function as an upholstery retainer clip that holds part of an outer cover against the anchor plate. A seat latch arrangement can be disposed between the anchor and slide plates releasably retaining a seat removably coupled by the slide bearings to the slide plate in a desired seat position.

40 Claims, 14 Drawing Sheets

(51) Int. Cl.
*B60N 2/06* (2006.01)
*B60N 2/075* (2006.01)

(56) References Cited

U.S. PATENT DOCUMENTS

| | | | |
|---|---|---|---|
| 4,291,856 A | 9/1981 | Urai et al. | |
| 4,478,383 A | 10/1984 | Urai et al. | |
| 4,671,572 A | 6/1987 | Young et al. | |
| 4,741,506 A | 5/1988 | Schwaegerle | |
| 5,037,155 A | 8/1991 | Holm et al. | |
| 5,044,694 A | 9/1991 | Koa | |
| 5,074,620 A | 12/1991 | Jay et al. | |
| RE35,485 E | 4/1997 | Stewart | |
| 5,876,085 A | 3/1999 | Hill | |
| 6,010,194 A | 1/2000 | Cykon | |
| 6,027,168 A | 2/2000 | Crossman et al. | |
| 6,105,921 A | 8/2000 | Carrig | |
| 6,419,395 B1 * | 7/2002 | Taylor | 384/42 |
| 6,634,711 B2 | 10/2003 | Phillips et al. | |
| 6,688,692 B2 | 2/2004 | Phillips et al. | |
| 6,799,803 B1 | 10/2004 | Lee et al. | |
| 6,945,505 B2 | 9/2005 | Hohnl et al. | |
| 6,986,550 B2 | 1/2006 | Gevaert et al. | |
| 7,086,657 B2 | 8/2006 | Michelau et al. | |
| 7,523,981 B2 | 4/2009 | Karube et al. | |
| 7,648,115 B2 * | 1/2010 | Lambert et al. | 248/429 |
| 7,887,020 B2 | 2/2011 | Ferguson et al. | |
| 8,196,887 B2 | 6/2012 | Dahlbacka et al. | |
| 2004/0011939 A1 | 1/2004 | Hohnl et al. | |
| 2004/0089785 A1 | 5/2004 | McCullen et al. | |
| 2009/0212190 A1 * | 8/2009 | Dahlbacka et al. | 248/429 |

* cited by examiner

LOW PROFILE SEAT POSITION ADJUSTMENT SYSTEM

CROSS REFERENCE TO RELATED APPLICATIONS

This application is a continuation-in-part of U.S. application Ser. No. 13/493,494, filed Jun. 11, 2012, issued Jan. 21, 2014 as U.S. Pat. No. 8,632,043, which in turn is a continuation of U.S. application Ser. No. 11/908,856, filed Mar. 5, 2008, now issued U.S. Pat. No. 8,196,887, issued Jun. 12, 2012.

FIELD

The present invention is directed to a seat position adjustment arrangement and more particularly to a seat position adjustment arrangement of low profile construction.

BACKGROUND

Fore-aft seat position adjustment arrangements are commonly used to permit the position of a vehicle seat to be moved relative to the front or rear of a vehicle in which the seat is mounted either closer to the front of the vehicle or closer to the rear of the vehicle to accommodate seat occupants of different sizes, heights and shapes. In the past, relatively simple seat mount and fore-aft seat position adjustment arrangements have been constructed of numerous components that require a considerable number of manufacturing steps that have tended to make them increasingly cost-prohibitive. One such known fore-aft seat position adjustment system used on lawn tractors employs a seat mount assembly formed of a metal plate that functions not only as a seat mount but also as a slide plate. The seat mount slide plate has a pair of spaced apart fore-aft extending guide slots defined by parallel slot sidewalls with each guide slot receiving a pair of bolts that are inserted through washers into metal spacer bushings attached to a bottom of the seat. Not only are an excessive number of parts required, namely bolts, washers, and bushings, but the time required to place washers on each bolt before maneuvering each bolt through the seat mount slide plate and spacer bushing in attaching the bolt to the seat bottom is considerable.

In addition, since spacer bushings are required to space the seat mount slide plate from the seat bottom, the vertical height or profile of such a seat mount and fore-aft position adjustment arrangement is rather tall. This results in a seat index point that can be undesirably high and which can limit clearance with a rollover protective structure of a vehicle cab when present. Finally, the use of metal fasteners is less than desirable because they can rust and can cause the seat mount slide plate to rust. The use of metal washers to help provide a fore-aft bearing surface is also undesirable as they too can rust and can also scrape the seat mount slide plate which can, in turn, lead to rusting of the slide plate.

Another common fore-aft adjustment system consists of a pair of seat adjusters attached between the bottom of the seat and the vehicle but can also be located between the bottom of the seat and an upper housing of its seat suspension. Each adjuster consists of an elongate metal upper rail bolted to the seat that is slidably interlocked with an elongate metal lower rail bolted to the vehicle or seat suspension with the upper rail moving or translating linearly relative to the lower rail during seat adjustment. At least one of the adjusters includes an integrated seat position latch used to releasably fix the position of the upper rail relative to the lower rail to releasably lock the seat in a desired fore-aft seat position.

Unfortunately, since the upper and lower rails of each adjuster typically include an elongate channel formed in one rail that receives a flange of the other rail, dirt and other debris, such as sand, gravel, or grass clippings, can and often does accumulate within the channel causing the rails to bind and even lock up preventing fore-aft seat position adjustment. In addition, since seat adjusters typically require a significant amount of space between the seat and the vehicle or suspension housing, quite often raising the seat 25 mm or more above the vehicle or suspension housing, seat adjusters are ill-suited for off-road vehicle seating applications where seat clearance is limited.

What is needed is a seat mount that also provides fore-aft seat position adjustment that overcomes at least some of these drawbacks.

SUMMARY

The present invention is directed to a seat position adjustment assembly constructed in accordance with the present invention that includes a plurality of spaced apart slide bearings slidably coupling an anchor plate to a slide plate in a manner that allows relative movement therebetween in manner permitting positioning of a vehicle seat that can be in a fore-aft direction. A seat position adjustment assembly constructed in accordance with the present invention slidably and removably couples a vehicle seat to part of a vehicle in which the seat is mounted, such as a mounting platform, which can be part of the vehicle floor or chassis or which can be part of a suspension of the seat, where equipped with a seat suspension.

Each slide bearing extends outwardly from the anchor plate having at least one slide plate receiving channel slidably receiving one of a pair of opposed edges of the slide plate that define one of a plurality of spaced apart guide slots formed in the slide plate. Each slide bearing can be elongated in the direction of relative motion with the slide plate with each slide plate receiving channel formed therein extending generally in the direction of elongation.

Where the seat position adjustment assembly is configured for fore-aft seat position adjustment, the slide plate is fixed so its guide slots are oriented generally in a fore-aft direction with each slide plate receiving channel of each slide bearing oriented generally in a fore-aft direction when slidably coupled with the slide plate. In a preferred embodiment, each slide bearing has a pair of spaced apart and generally parallel fore-aft extending slide plate receiving channels that each slidably receives a corresponding slot defining edge of a respective fore-aft extending guide slot formed in the slide plate in which the slide bearing is slidably received.

Each slide bearing can be removably anchored to the anchor plate by a keeper that releasably engages part of the slide bearing extending between the anchor plate and the slide plate. In a preferred keeper embodiment, the keeper is configured for snap fit engagement with the slide bearing. Such a keeper can be configured to straddle the slide bearing in a direction generally transverse to the at least one slide plate receiving channel formed in the slide bearing to help prevent disengagement from the slide bearing during seat position adjustment. One preferred keeper has a pair of spaced apart arms straddling opposite sides or ends of the slide bearing when removably attached to the slide bearing. Each arm can engage the slide bearing in a direction generally parallel to a slide plate receiving channel but preferably engages the slide bearing in a direction generally transverse thereto to help prevent keeper disengagement during seat position adjustment.

In a preferred embodiment, each slide bearing and keeper form a slide bearing assembly used to slidably couple the anchor plate to the slide plate in a manner that permits releasable detachment therefrom, such as when servicing the seat position adjustment assembly and/or the seat. In one slide bearing assembly embodiment, the slide bearing includes a retainer engagement channel that receives part of the keeper that can be disposed at an angle relative to the at least one slide plate receiving channel.

In a preferred embodiment, the slide bearing has a pair of spaced apart retainer engagement channels generally transverse to the at least one slide plate receiving channel orienting a keeper received in the retainer engagement channels generally perpendicular to the direction of seat adjustment helping prevent the keeper from disengaging from the slide bearing during seat position adjustment. In another embodiment, at least one of the retainer engagement channels can be generally parallel to the at least one slide plate receiving channel.

A preferred slide bearing embodiment has a retainer base disposed on one side of the anchor plate and a head extending outwardly from the retainer base through a hole in the plate outwardly beyond the other side of the plate. The keeper engages the head of the slide bearing between the anchor plate and slide plate anchoring the slide bearing to the anchor plate. Where a relatively low profile seat position adjustment assembly is desired, the keeper is relatively thin and extends alongside the anchor plate spacing the anchor plate from the slide plate also providing a bearing surface facing the slide plate against which the slide plate can slidably contact during seat position adjustment.

The keeper can be generally U-shaped having a pair of spaced apart arms with a hook at the free end of each arm that can be configured for snap fit engagement with the head of a slide bearing to which the keeper is being attached. During attachment of such a keeper embodiment, the arms of the keeper slidably straddle the slide bearing head until the hooks snap into engagement with an abutment of the slide bearing on one side of the head and a beam of the keeper interconnecting the arms bears against the abutment of the slide bearing on the opposite side of the head. Where the slide bearing head includes more than one retainer engagement channel, each retainer engagement channel receives a corresponding arm of the keeper during attachment of the keeper to the slide bearing head.

Where the anchor plate forms part of a seat bottom having an outer cover, a keeper engaged with the head of a slide bearing extending from the anchor plate can bear against the cover urging the cover against the anchor plate such that the keeper further functions as an upholstery retainer clip. Where the seat position adjustment assembly is of low profile construction, the keeper not only can help hold the cover against the anchor plate, but can also function as a spacer that spaces the slide plate from the anchor plate. Such a keeper can also provide a slide bearing surface in slidable contact with the slide plate.

A seat position adjustment assembly constructed in accordance with the present invention can include a seat position latch arrangement disposed between the anchor plate and slide plate that includes a latch handle pivotally engaged with the anchor plate that is biased toward the slide plate releasably retaining the seat in a desired seat position when engaged with the slide plate. The seat position latch arrangement can include a spring, such as a coil spring, captured in compression between the anchor plate and latch handle that biases the handle toward a slide plate engaging position that releasably retains the seat in one of a plurality of preset seat positions.

These and various other features, aspects, and advantages of the present invention will be made apparent from the following descriptions of the drawings and detailed description.

BRIEF DESCRIPTION OF THE DRAWINGS

One or more preferred exemplary embodiments of the invention are illustrated in the accompanying drawings in which like reference numerals represent like parts throughout and in which.

Figure 1:
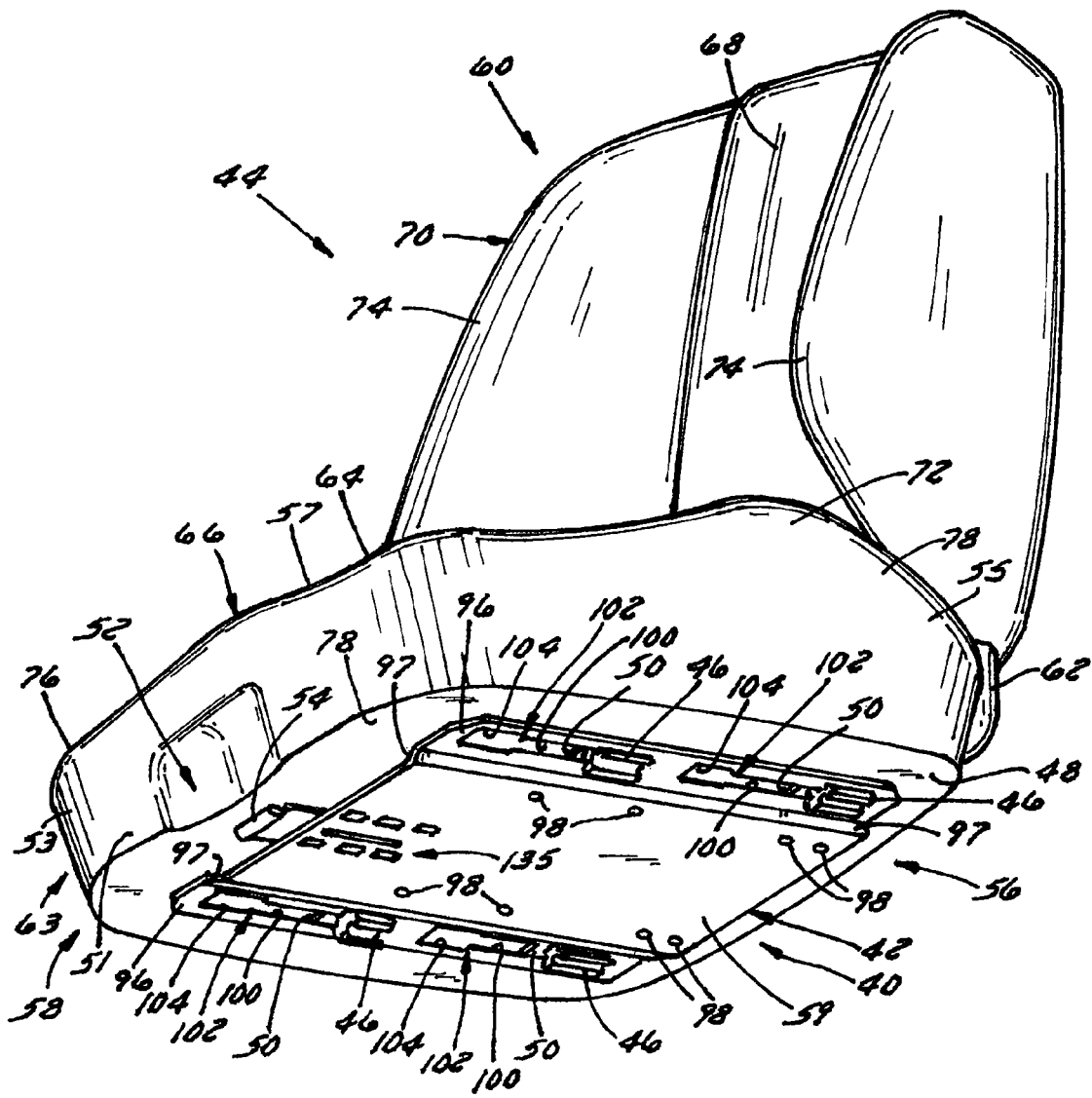
FIG. 1 is a bottom perspective view of a vehicle seat equipped with a seat position adjustment assembly constructed in accordance with the present invention slidably coupling the seat to a slide plate.

Before explaining embodiments of the invention in detail, it is to be understood that the invention is not limited in its application to the details of construction and the arrangement of the components set forth in the following description and illustrated in the drawings. The invention is capable of other embodiments or being practiced or carried out in various ways. Also, it is to be understood that the phraseology and terminology employed herein is for the purpose of description and should not be regarded as limiting.

DETAILED DESCRIPTION

FIGS. 1-10 illustrate a seat position adjustment assembly 40 constructed in accordance with the present invention that has a seat position adjustment enabling slide plate 42 slidably engaged by a plurality of slide bearings 46, shown in more detail in FIGS. 11-14, defining a seat mounting assembly 56 used to mount a vehicle seat 44 in a vehicle where the seat mounting assembly 56 is disposed between the seat 44 and a seat mounting platform 45 (depicted in phantom in FIG. 10) in or of the vehicle to which the seat 44 is mounted. A keeper 50, show in more detail in FIGS. 15-18, can be and preferably is employed to engage each slide bearing 46 in a manner that helps anchor the slide bearing 46 in place. Each one of the slide bearings 46 slidably engages the slide plate 42 by slidably engaging one of a plurality of spaced apart seat position guides each of which preferably is formed of a slot 100 in the slide plate 42 defined by a pair of generally opposed slot edges 164 of the plate 42. The seat position adjustment assembly 40 can also include a seat position latch arrangement 52 used to releasably retain the seat 44 in a desired one of a plurality of seat positions relative to the seat mounting platform 45 of the vehicle.

Such a seat position adjustment assembly 40 employing a slide plate 42 slidably engaged by slide bearings 46 constructed in accordance with the present invention can be configured with slide bearings 46 carried by and extending outwardly from the seat mounting platform 45 with the slide bearings 46 slidably engaging a slide plate 42 carried by and/or formed of part of a bottom 48 of the seat 44 in mounting the seat 44 to the platform 45. A preferred seat position assembly 40 shown in FIGS. 1-10 employs slide bearings 46 carried by and extending outwardly from the seat bottom 48 that slidably engage a slide plate 42 carried by and/or formed of the mounting platform 45.

Figure 5:
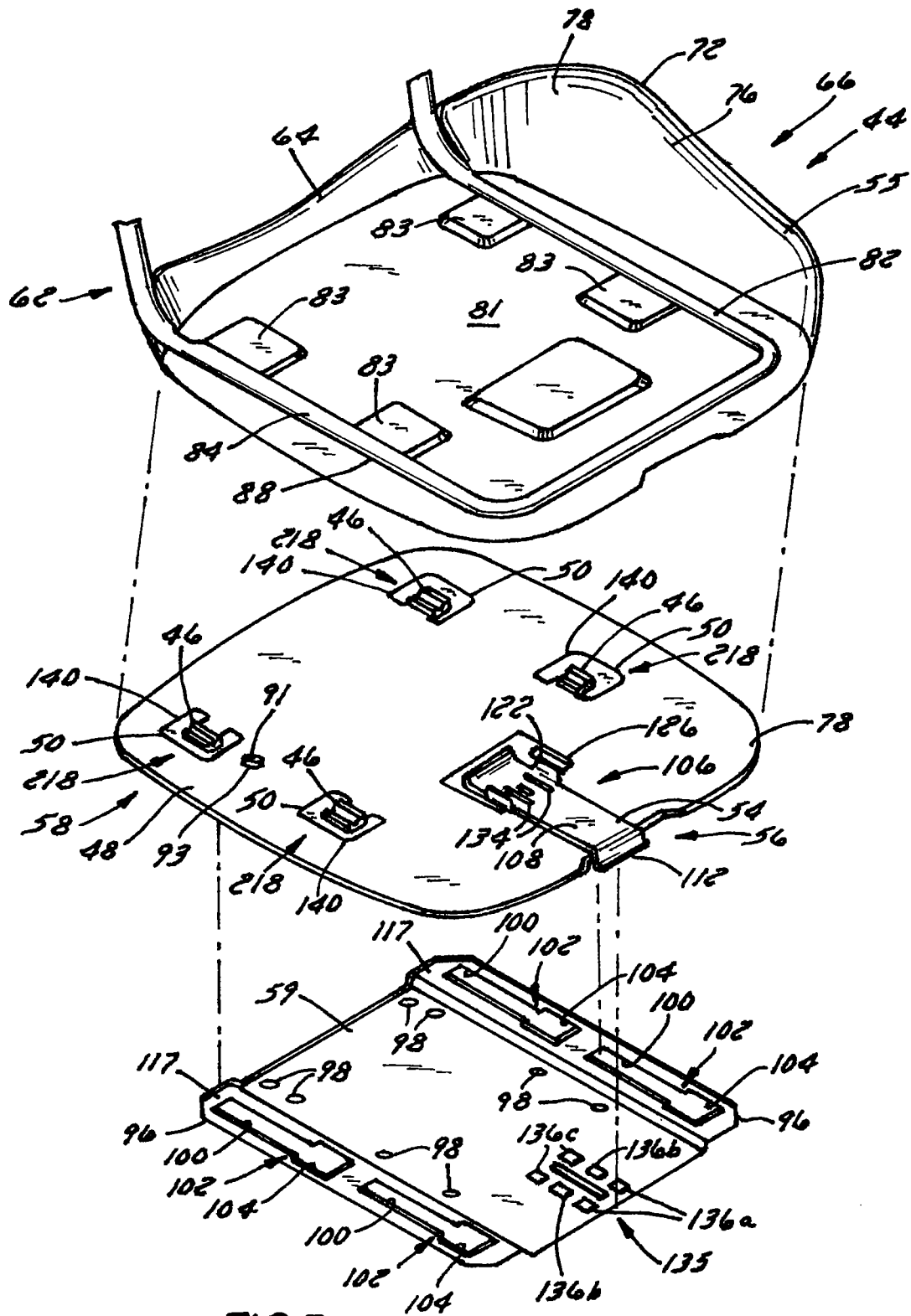
FIG. 5 is a bottom perspective exploded view of a base of the seat and the seat position adjustment assembly.
Figure 6:
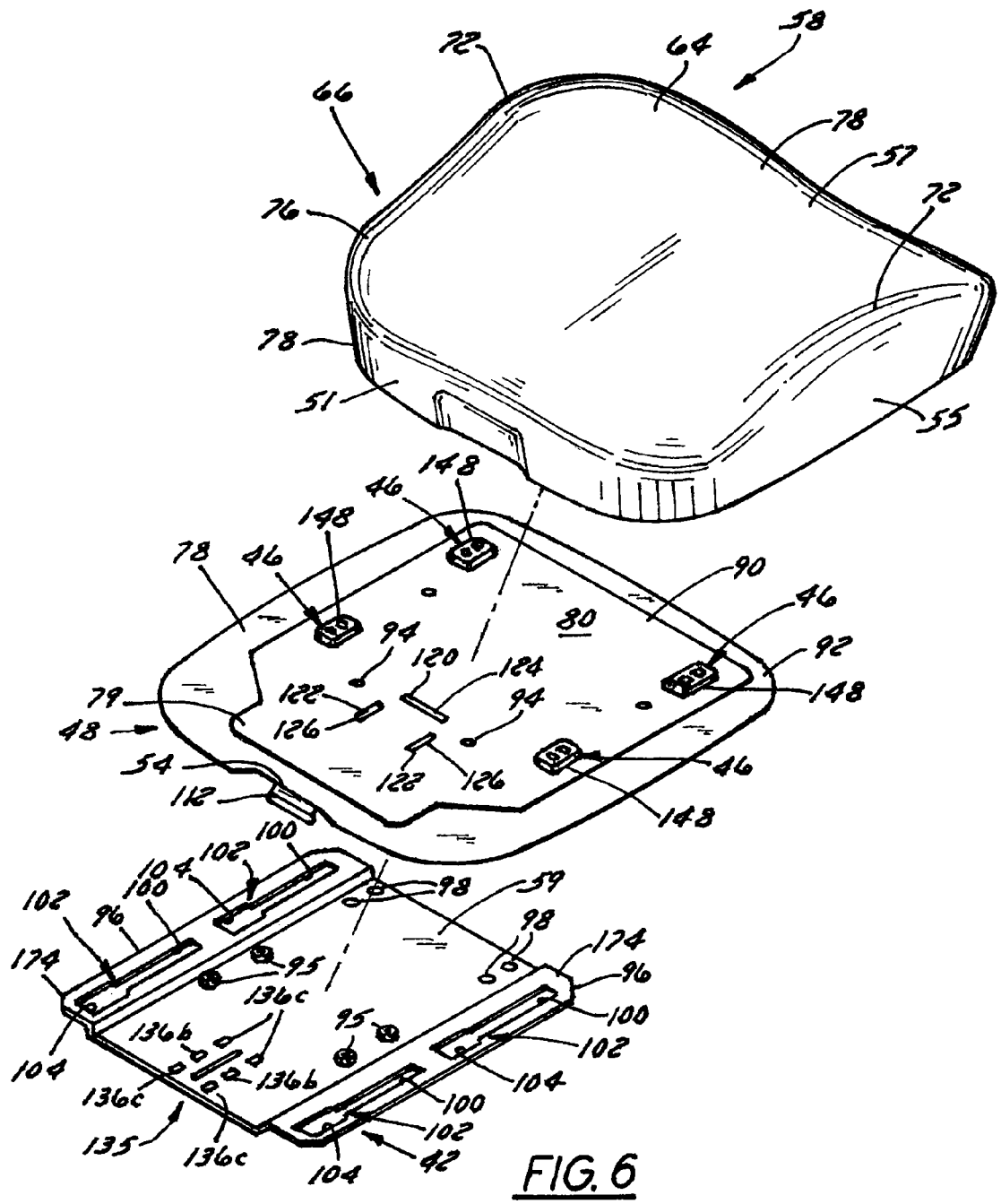
FIG. 6 is a top perspective exploded view of the of the seat base and seat position adjustment assembly.
Figure 7:
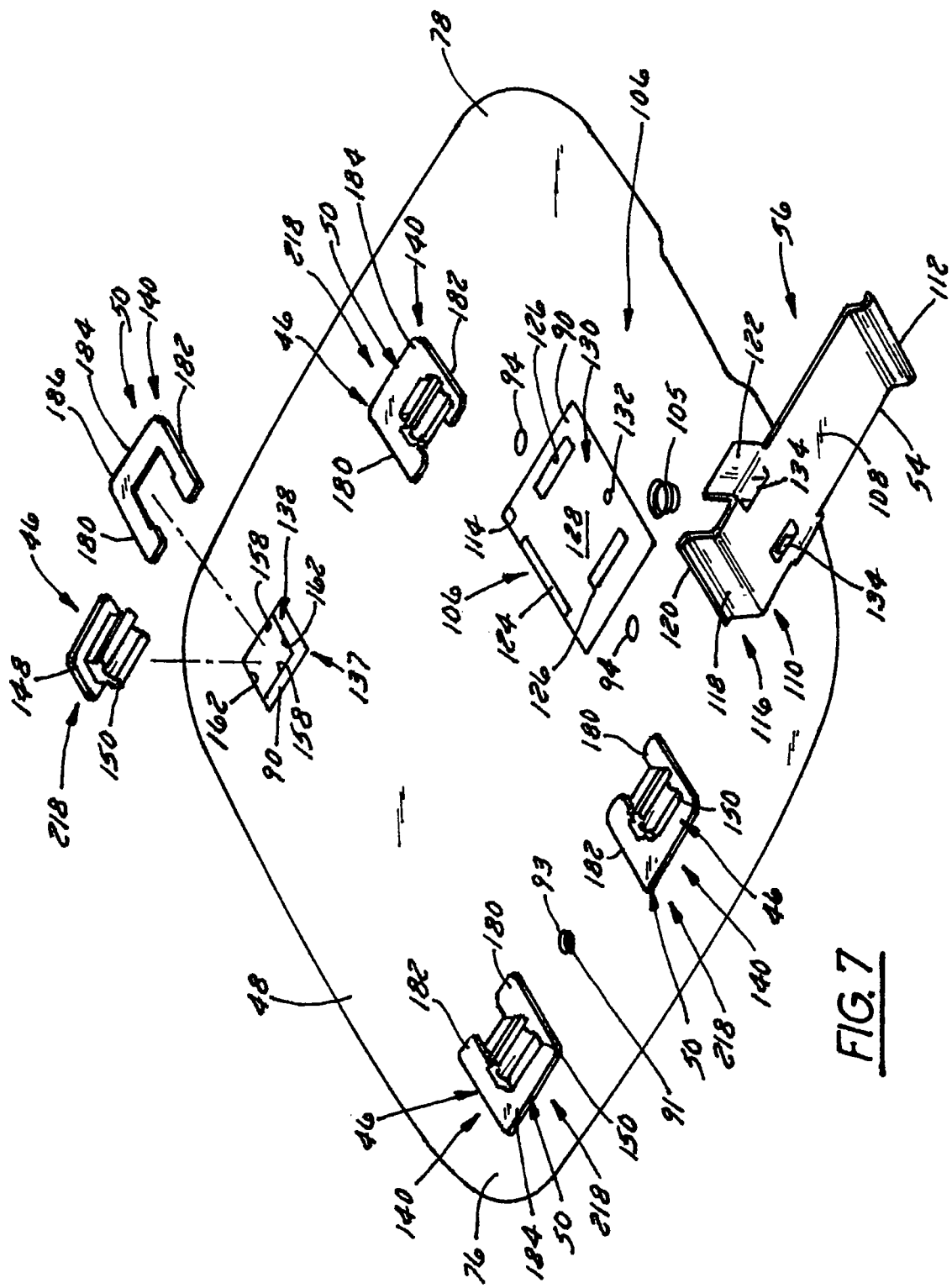
FIG. 7 is an enlarged perspective view of a seat bottom formed of an anchor plate covered by a seat cover and carrying slide bearing assemblies of the seat position adjustment assembly with one of the slide bearing assemblies and a seat position latch arrangement shown exploded from the seat bottom.

With specific reference to FIGS. 5-10, the slide bearings 46 are respectively received in bearing seats 137 formed in an anchor plate 90 that can be attached to the seat 44 or platform 45 and which can form part of the seat 44 or platform 45 if desired. In the preferred seat position assembly shown in FIGS. 1-10, the anchor plate 90 forms part of the seat bottom 48 with each bearing seat 137 including a slide bearing receiving hole 138, such as shown in FIG. 7, through which part of the slide bearing 46 extends when seated in the seat 137.

As is best depicted by FIGS. 5-7, the anchor plate 90 has a plurality of spaced apart bearing receiving holes 138 arranged in the plate 90 to respectively receive, orient and locate each slide bearing 46 relative to guide slots 100 in the slide plate 42 so each slide bearing 46 will be slidably received in a corresponding slot 100 during assembly to the slide plate 42. Such a seat position adjustment assembly 40 having a slide bearing anchor plate 90 can be configured so the anchor plate 90 is mounted to or formed of the seat mounting platform 45 with the slide bearings 46 carried by and extending upwardly from anchor plate 90 slidably engaging a slide plate 42 carried by and/or formed of part of a bottom 48 of the seat 44 but preferably is configured with slide bearings 46 carried by and extending downwardly from an anchor plate 90 attached to or formed of the seat bottom 48 that slidably engage a slide plate 42 carried by and/or formed of the mounting platform 45.

In the preferred seat position adjustment assembly 40 shown in FIGS. 1-10, a plurality of spaced apart slide bearings 46 are carried by the seat 44 and extend outwardly from the seat bottom 48 downwardly toward a slide plate 42 mounted to an underlying seat mounting platform 45. The seat mounting platform 45, shown in phantom in FIG. 10, can be a vehicle floor, can be part of a vehicle chassis, or can be part of a suspension of the seat 44, where the seat 44 is supported by a seat suspension (not shown). Where the mounting platform 45 is part of a suspension that supports the seat 44, the mounting platform 45 can be part of a housing of the seat suspension that is disposed between the seat 44 and the vehicle floor or chassis.

The seat mounting platform 45 can be located in or on a vehicle to which the seat 44 is being mounted. Where the vehicle is equipped with a cab (not shown), the mounting platform 45 can be located within the cab such that the seat 44 is disposed within the cab when mounted to the platform 45. Types of vehicles for which a seat position adjustment assembly 40 constructed in accordance with the present invention are well suited include agricultural tractors, turf care equipment, recreational vehicles, such as all terrain vehicles (ATV's) and golf carts, utility vehicles (UTV's) industrial lift trucks, earthmoving machinery, and other off-road vehicles.

As is best shown in FIG. 1, the seat 44 includes a seat base 58 and a backrest base 60 extending upwardly from the seat base 58 that is supported by a seat frame 62 that interconnects the seat base 58 and backrest base 60. The seat base 58 includes a seat cushion 66 having a generally horizontally extending seat occupant supporting surface 64 upon which the buttocks and legs of a seat occupant rest. The backrest base 60 has a backrest cushion 70 with a generally vertically extending back supporting surface 68 against which the backside or lumbar region of a seat occupant rests. If desired, the seat 44 can include one or more seat bolsters 72, such as for providing hip support to a seat occupant, and can include one or more backrest bolsters 74, such as for providing lateral support to the torso of a seat occupant.

Each cushion 66 and 70 can be of one-piece and unitary construction that can further be of substantially homogeneous construction, if desired. Such a cushion 66 and 70 can be formed of an open cell or closed cell foam, such as a urethane foam, or the like.

Figure 10:
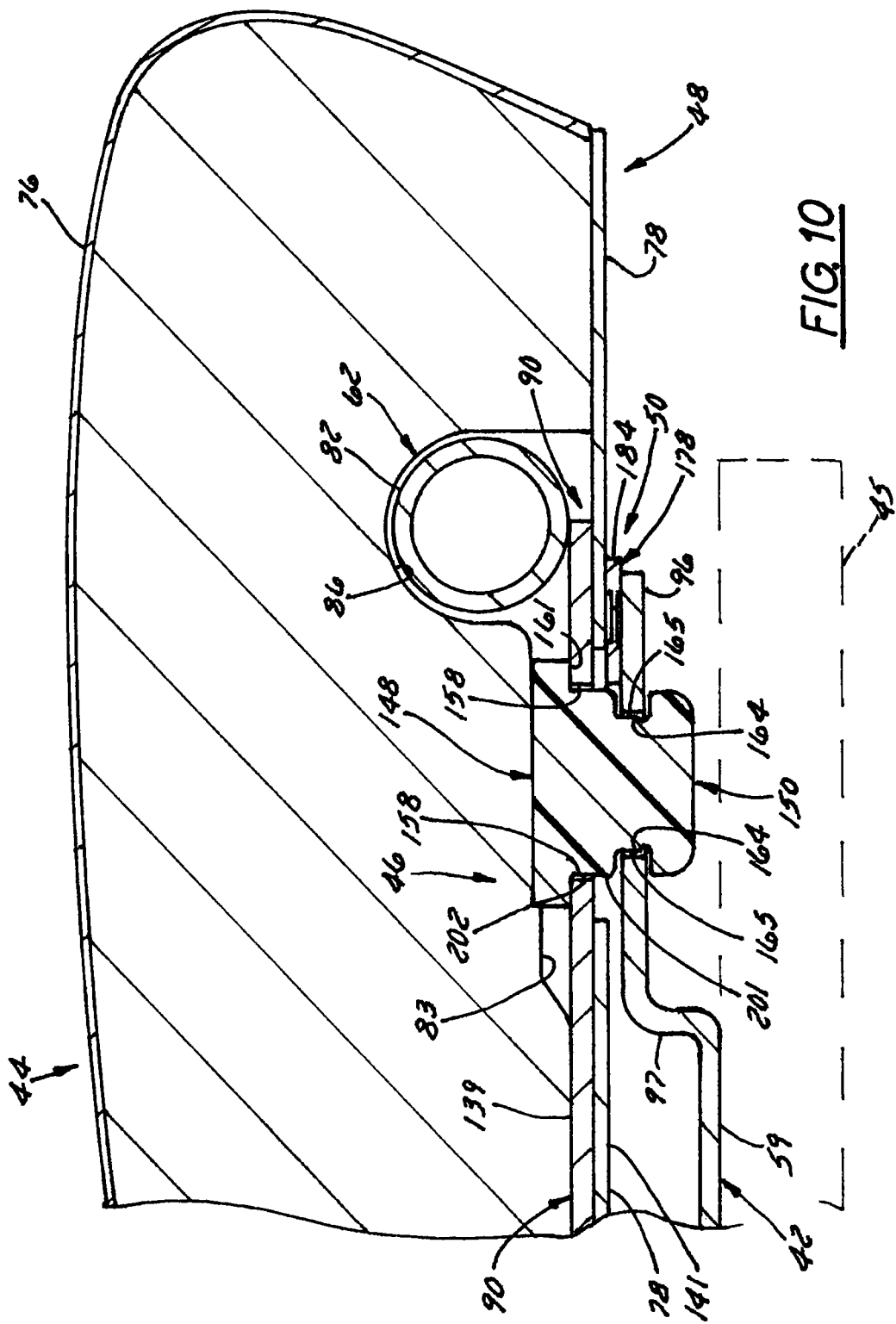
FIG. 10 is a fragmentary cross sectional view of part of the seat base showing part of the seat cushion, seat frame, and anchor plate in relation to a slide bearing, keeper and slide plate of the seat position adjustment assembly.
Figure 11:
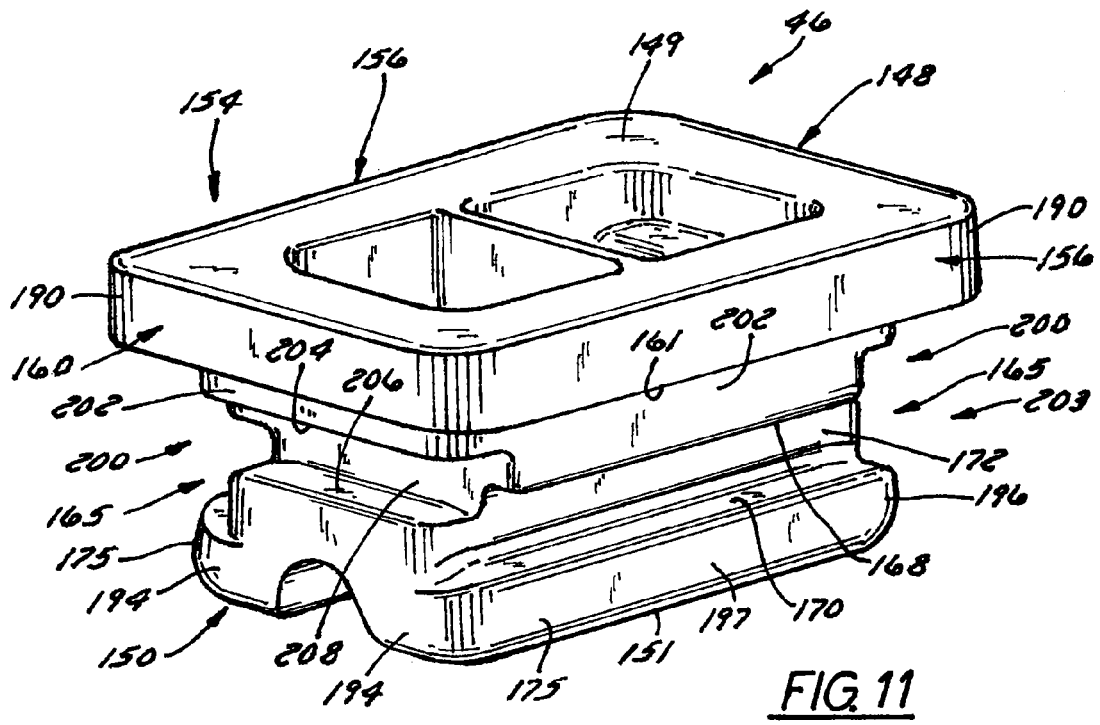
FIG. 11 is top perspective view of a preferred embodiment of a slide bearing constructed in accordance with the present invention.
Figure 12:
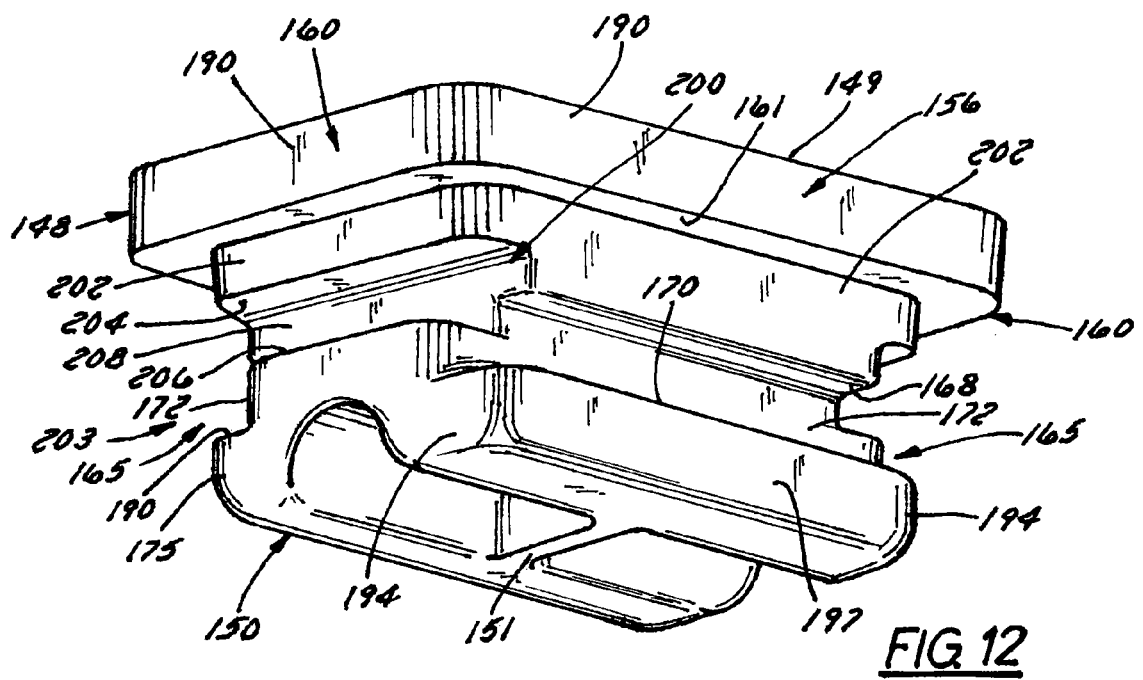
FIG. 12 is a bottom perspective view of the slide bearing of FIG. 11.
Figure 13:
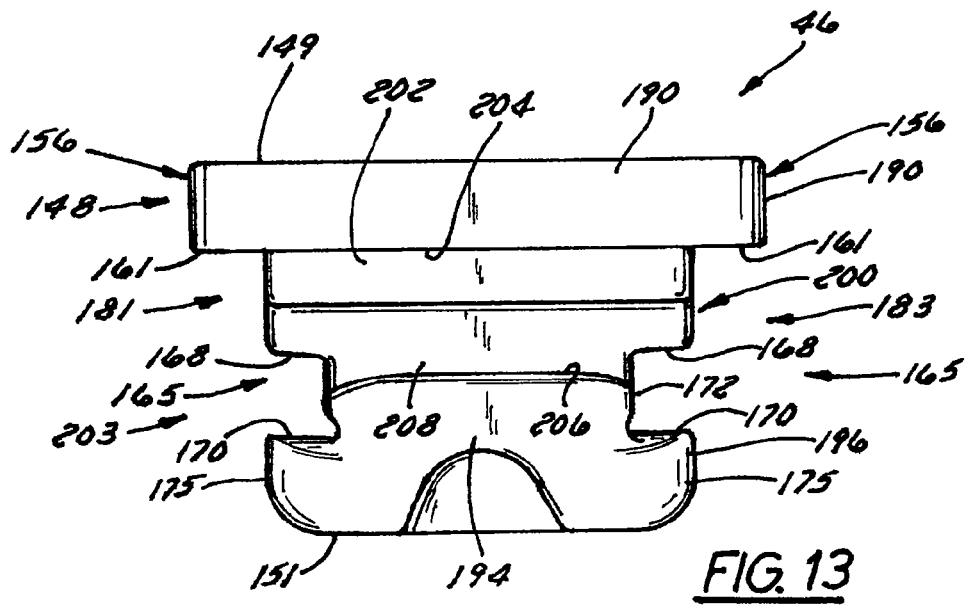
FIG. 13 is a front elevation view of the slide bearing of FIG. 11, the rear elevation view being a mirror image thereof.
Figure 14:
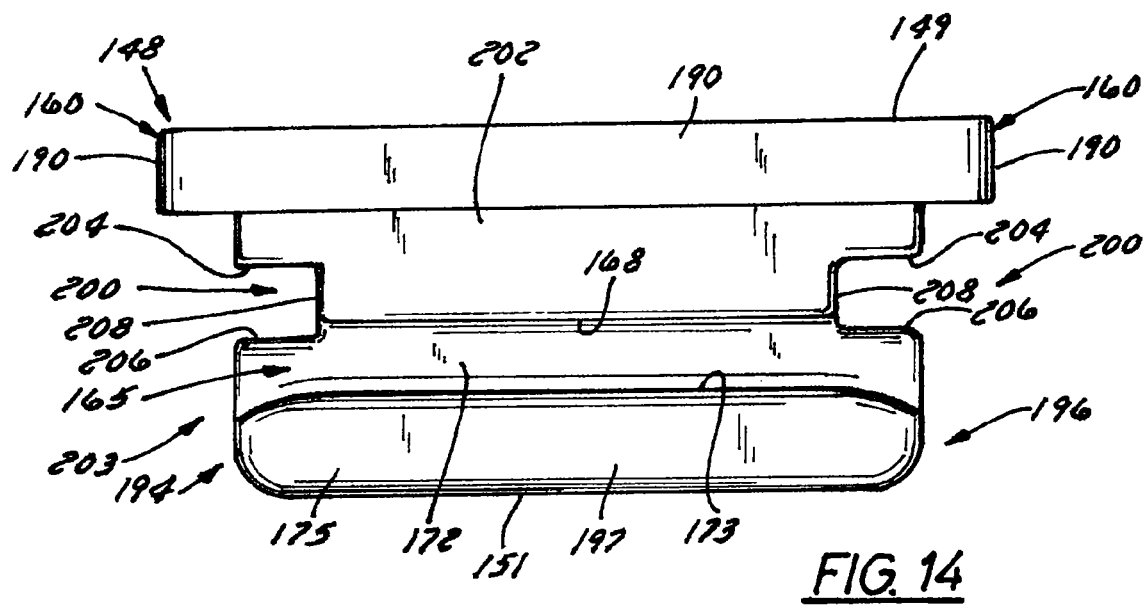
FIG. 14 is a right side elevation view of the slide bearing of FIG. 11, the left side elevation view being a mirror image thereof.
Figure 15:
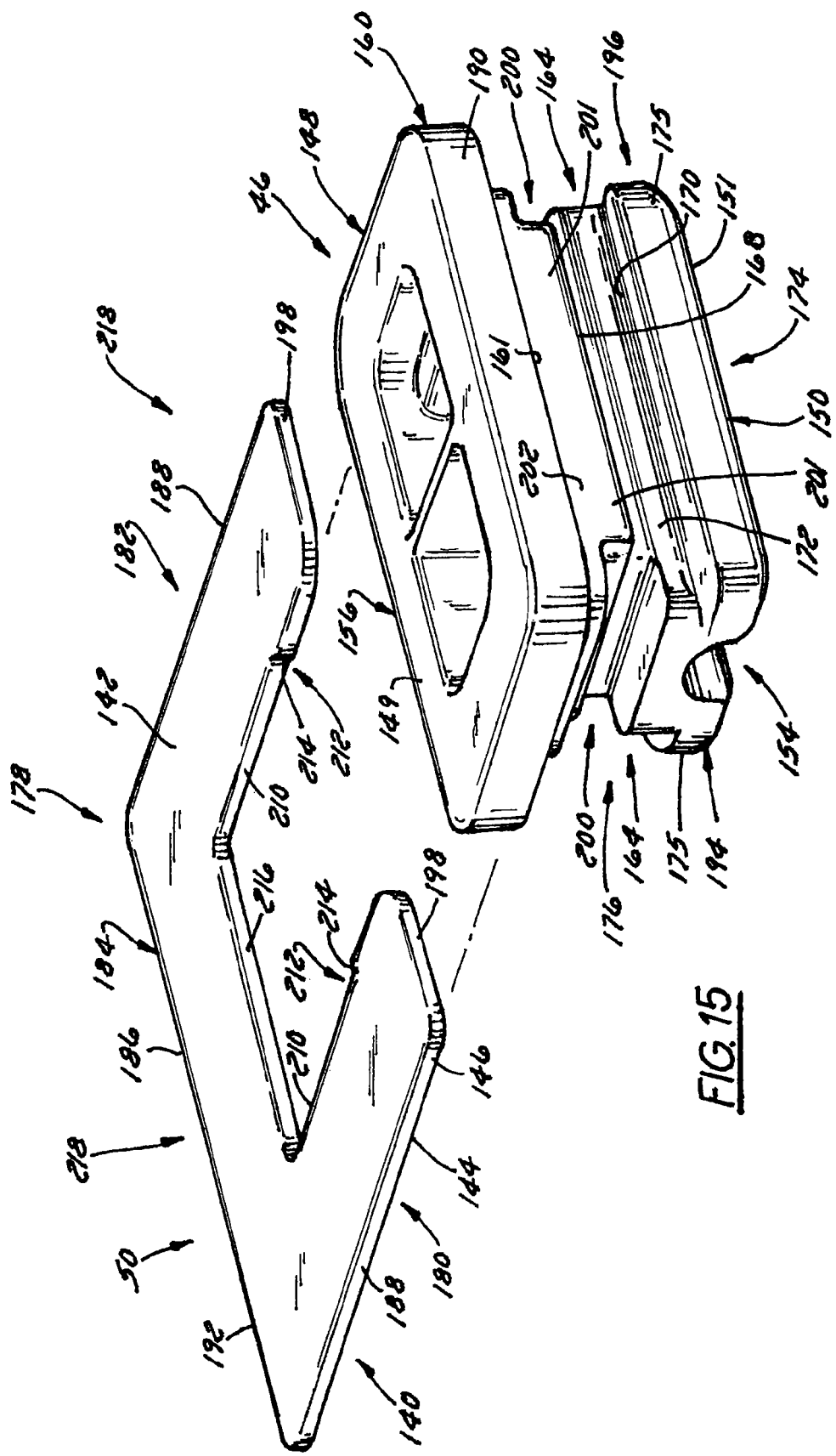
FIG. 15 is an exploded view of a slide bearing assembly constructed in accordance with the present invention depicting attachment of the keeper to the slide bearing with the seat bottom and slide plate removed for clarity.

With reference to FIGS. 5 and 10, the seat frame 62 can be of tubular construction that can include a plurality of frame tubes 82 and 84 received in corresponding frame-receiving channels 86 and 88 integrally formed in a bottom 81 of the seat cushion 66. The frame tubes 82, 84 and channels 86, 88 can be arranged in a loop such as the generally U-shaped loop shown in FIG. 5 that extends around the periphery of the seat base 58. The frame tubes 82, 84 and channels 86, 88 can be configured to provide engagement, such as snap-fit or friction engagement, between the tubes 82, 84 and the cushion 66 if desired.

Although not shown in the drawings, the seat frame 62 also extends upwardly within the backrest base 60 such that the backrest cushion 70 can also be secured to the frame 62 in a manner similar to that of the seat cushion 66 of the seat base 58. The upwardly extending portion of the seat frame 62 can also be of tubular construction and can further include a plurality of cross members interconnecting frame tubes, if desired.

The seat 44 can include a seat cover 76 with a shroud 63 form fitted to slip over the seat cushion 66 and anchor plate 90 with the shroud 63 including a front panel 51, side panels 53, 55 and a top panel 57, which respectively overlap the front, sides and top of the seat cushion 66, and including a bottom panel 78, which overlaps the anchor plate 90 when attached to the seat base 58. As is best shown in FIG. 7, the bottom panel 78 includes cutouts in registry with each slide bearing receiving hole 138 and another cutout to accommodate the seat position latch arrangement 52.

Figure 4:
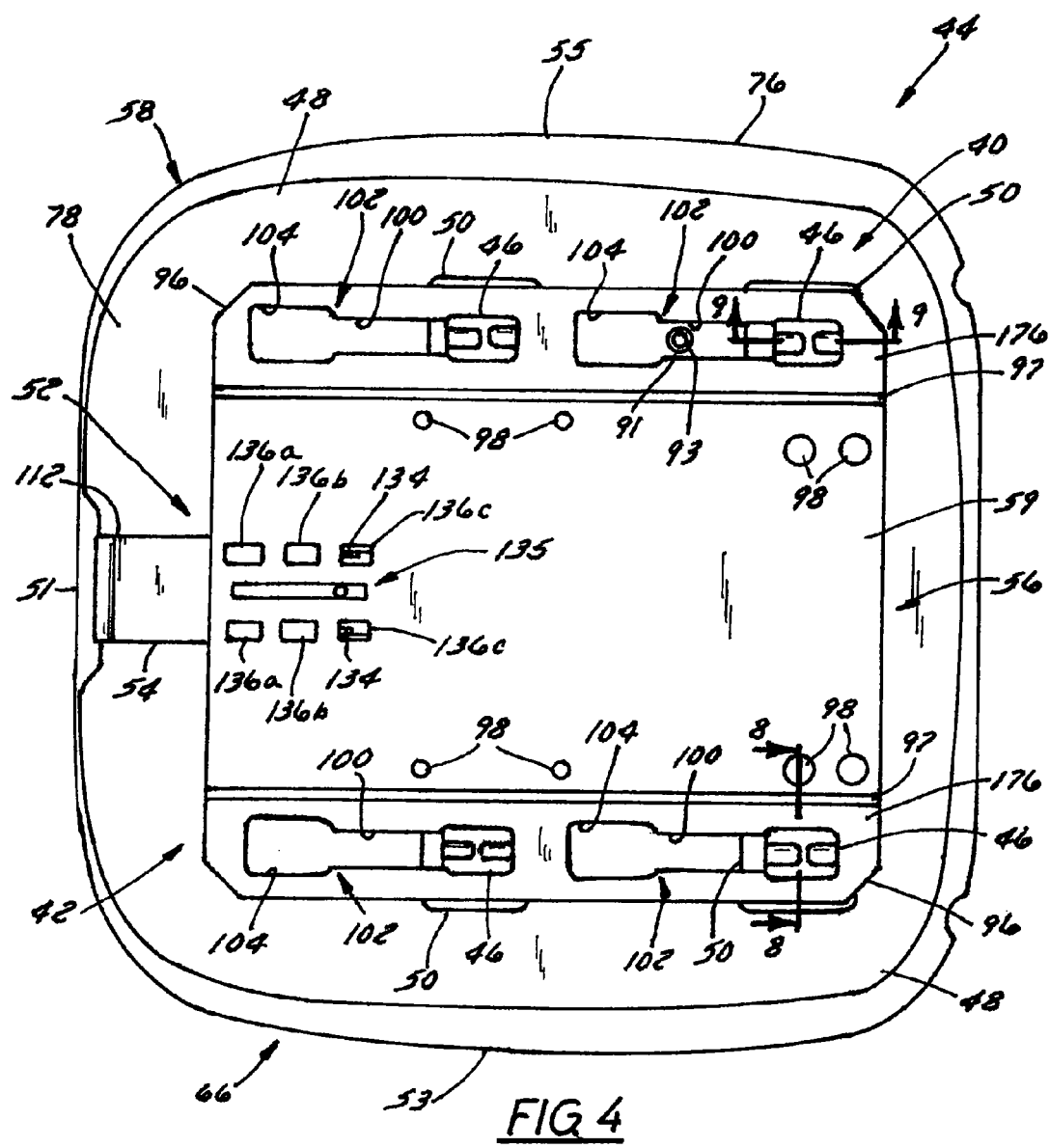
FIG. 4 is a bottom plan view of the seat and seat position adjustment assembly.

It should be noted in the exploded views of FIGS. 4-6 that the bottom panel 78 is shown detached from the front, side and top panels 51, 53, 55 and 57 of the shroud 63 for purposes of illustration only to help show various features, aspects and components of the seat position adjustment assembly 40, including in relation to the seat base 58. Similarly, the bottom panel 78 is shown detached in FIG. 7 to more clearly illustrate the seat position latch arrangement 52 as well as help show how the bottom panel 78 can be retained against the anchor plate 90 when keepers 50 are used to anchor the slide bearings 46 to the plate 90.

In one cover embodiment, the cover 76 can be formed of an upholstery material, such as leather, vinyl, fabric, cloth, or another type of upholstery material, which can be stitched, sewn, formed or otherwise configured in a manner that produces a cover 76 with such a shroud 63. In another embodiment, the cover 76 is molded, such as from plastic, and formed in a manner that produces a form-fitting shroud 63. In a still further embodiment, the cover 76 can be integrally formed of the seat cushion 66, such as during molding of the cushion 66, with the bottom panel 78, if such a panel 78 is used, provided separately. Where a separate bottom panel 78 is used, the panel 78 can be formed of a sheet, such as a plastic sheet, or can be formed of an upholstery material, such as leather, vinyl, fabric, cloth or another type of upholstery material.

In the preferred seat position adjustment assembly 40 shown in FIGS. 1-10, the anchor plate 90 is substantially rigid and underlies the bottom 81 of the seat cushion 66 of the seat base 58, such as depicted in FIGS. 5 and 10, with the plate 90 being attached to the seat 44 in a manner that securely immovably fixes the plate 90 to the seat 44. As is shown in FIGS. 5-10, the plate 90 underlies the bottom 81 of the seat cushion 66 forming, at least in part, the bottom 48 of the seat base 58. Where the anchor plate 90 forms or helps form the seat bottom 48, the plate 90 preferably imparts structural rigidity to the seat bottom 48 helping to produce a seat bottom 48 that is substantially rigid.

The anchor plate 90 can be made of metal, such as steel or aluminum, and can be formed by stamping or using another suitable forming method. The plate 90 can also be made of a molded material, such as a fiber reinforced plastic, such as fiber reinforced nylon, carbon fiber reinforced plastic, or another fiber reinforced composite material. In either embodiment, the resultant anchor plate 90 is substantially rigid enabling the slide bearings 46 to be securely anchored to the plate 90 when assembled to the plate 90. Such a substantially rigid anchor plate 90 also can help support a bottom 81 of a seat cushion 66 resting on the plate 90 thereby helping to support the weight of a seat occupant sitting in the seat 44.

With reference to FIGS. 5 and 10, the anchor plate 90 is secured to the seat frame 62, such as by using fasteners, by welding, or via adhesive attachment, with the plate 90 being generally rectangular, e.g., square, extending between the frame tubes 82 and 84 along the seat bottom 48. As is best shown in FIG. 5, the plate 90 can extend across substantially the entire width of the seat base 58 and substantially the entire length of the seat base 58. If desired, the anchor plate 90 can be of generally rectangular construction extending side-to-side and front-to-back forming the seat bottom 48.

As is best shown in FIGS. 5 and 6, the anchor plate 90 can be configured with a generally planar or flat slide bearing mounting panel 80 that is generally rectangular, e.g., square, and which can extend between fore-aft oriented segments of the frame tubes 82 and 84 substantially the entire width of the seat bottom 48. The plate 90 can include a narrower seat position latch anchor section 79, also shown in FIG. 6, which can project forwardly from the slide bearing mounting panel 80. Such an anchor plate 90 not only underlies substantially the entire seat cushion bottom 81 supporting the cushion 66, along with at least part of a load from a seat occupant sitting in the seat 44, but also helps structurally rigidify the seat frame 62 thereby strengthening the entire seat 44.

In the preferred embodiment of the anchor plate 90 shown in FIGS. 1-10, the anchor plate 90 includes four spaced apart bearing seats 137 arranged in a generally rectangular, e.g., square, bearing seat layout with a bearing seat 137 disposed in each corner of the bearing seat layout. Each bearing seat 137 is constructed and arranged to receive a corresponding one of four slide bearings 46. In the preferred anchor plate embodiment shown in FIGS. 1-10, each bearing seat 137 is a through-hole 138 extending through the anchor plate 90 through which part of a corresponding slide bearing 46 extends.

In the preferred anchor plate embodiment shown in FIGS. 1-10, the anchor plate 90 has a first pair of slide bearing receiving holes 138 that are generally aligned and spaced apart in the direction of seat travel, e.g., seat position adjustment travel, and has a second pair of slide bearing anchoring holes 138 generally aligned and spaced apart in the direction of seat position travel. The first pair of seat position adjustment direction aligned holes 138 is generally parallel with the second pair of seat position adjustment direction aligned holes 138. As is also depicted by FIGS. 1-10, each seat position adjustment direction aligned pair of holes 138, e.g., aligned in a fore-aft direction, has one hole 138 disposed toward or adjacent a rear or aft end of the seat bottom 48 and the other hole 138 disposed toward or adjacent a front or fore end of the seat bottom 48. All of the slide bearing seats 137, and hence all of the slide bearing receiving holes 138, lie substantially in the same plane such that they are all substantially coplanar with one another.

Figure 2:
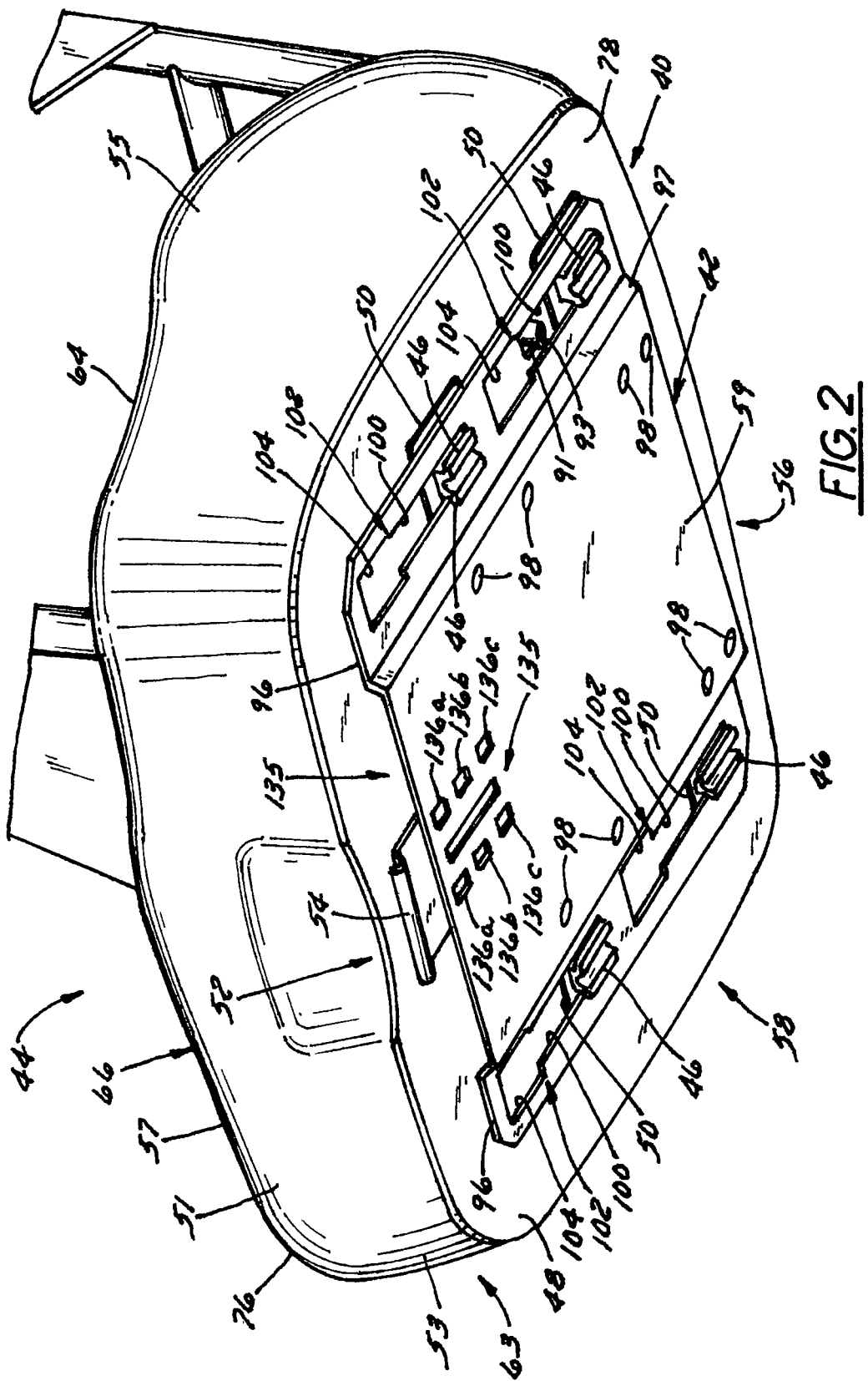
FIG. 2 is a first bottom perspective view of the seat and seat position adjustment assembly disposed in a first fore-aft seat position.

The anchor plate 90 can include an outwardly extending seat position travel limiter 91 disposed between a pair of seat position adjustment direction aligned slide bearing receiving holes 138 that limit seat travel in a manner that prevents disengagement of the slide bearings 46 from the slide plate 42 during seat position adjustment. As is best shown in FIG. 2, such a limiter 91 is disposed in one of the guide slots 100 formed in the slide plate 42 when the seat 44 is attached via slide bearings 46 to the slide plate 42. In limiting seat travel, the limiter 91 abuts against an end of the guide slot 100 in which the limiter 91 is disposed.

By limiting seat travel in this manner, the limiter 91 also prevents each slide bearing 46 from reaching the keyhole section 102 of its corresponding slot 100 that is enlarged to enable insertion of the slide bearing 46 into the slot 100 during assembly. By the limiter 91 preventing each slide bearing 46 from reaching the keyhole slot section 102 during seat movement during position adjustment, the limiter 91 prevents disengagement of each slide bearing 46 from the slide plate 42 thereby preventing detachment from the slide plate 42.

Figure 3:
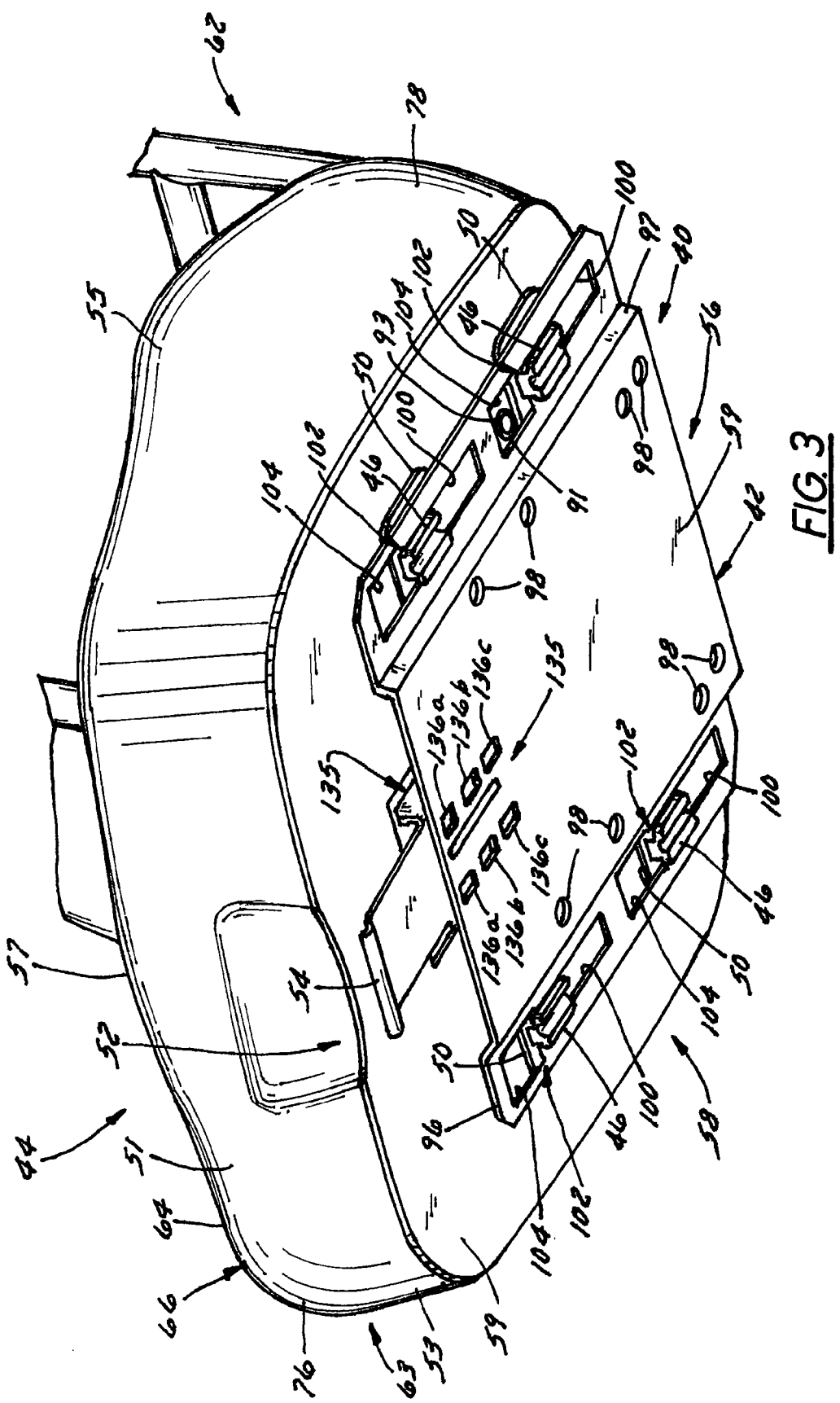
FIG. 3 is a second bottom perspective view of the seat and seat position adjustment assembly disposed in a second fore-aft seat position.

As is best shown in FIGS. 2-4, the limiter 91 can include a mounting bore extending outwardly from the anchor plate 90 that can be threaded so as to removably receive a stop 93 that is attached after insertion of each slide bearing 46 into a corresponding guide slot 100 in mounting the seat 44 to the slide plate 42. Where the limiter 91 is configured to releasably receive such a stop 93, the height of the limiter 91 is low enough to clear the slide plate 42 until the stop 93 is attached. When the stop 93 is attached, at least part of the stop 93 is disposed in a corresponding guide slot 100 so as to abut against one end of the slot 100 in limiting seat position travel. When the stop 93 is removed, the remainder of the limiter 91 can clear the slide plate 42 enabling each slide bearing 46 to reach the enlarged keyhole 102 of its corresponding slot 100 so the slide bearing 46 can be disengaged from the slide plate 42.

In one preferred embodiment, the stop 93 can be a self tapping hex socket head cap screw (not shown) that is removably threaded into an extruded boss of the limiter 91 that is carried by the anchor plate 90. In another preferred embodiment, the stop 93 can be a molded block (not shown) or the like that snaps onto a receiver of the limiter 91 carried by the anchor plate 90.

With reference to FIGS. 9-14, each slide bearing 46 has a retainer base 148 from which a slide plate engaging head 150 outwardly extends. The retainer base 148 is disposed at one end of the slide bearing 46, depicted as a generally flat top 149, and the head 150 extends outwardly from the base 148 to an opposite slide bearing end terminating at a generally flat bottom 151 that can be generally parallel to the top 149. The retainer base 148 can be wider and/or longer than the head 150 with the base 148 shown in FIGS. 9-14 extending outwardly of the head 150 beyond an outer periphery of the head 150. In the preferred slide bearing embodiment, the retainer base 148 extends outwardly of the head 150 along at least one side of the head 150 and preferably along a plurality of sides of the head 150.

The slide bearing retainer base 148 is larger than the hole 138 in the anchor plate 90 in which the slide bearing 46 seats and the head 150 is smaller than the hole 138 such that the retainer base 148 abuts against one side 139 of the plate 90 and the head 150 extends through the hole 138 outwardly beyond the other side 141 of the plate 90. In the preferred slide bearing embodiment shown in the drawings, the retainer base 148 includes at least one flange 160 that provides an abutment shoulder 161 that overlies and abuts against part of the adjacent side 139 of the anchor plate 90 with the flange 160 and shoulder 161 extending outwardly of at least a portion of the periphery of the hole 138 in which the slide bearing 46 is seated.

The slide bearing head 150 has a neck 202 adjacent the retainer base 148 that seats in the hole 138 and a slide plate engaging portion 203 extending outwardly beyond the anchor plate 90 in which least one and preferably a pair of slide plate receiving channels 165 are formed. The neck 202 has a cross sectional shape or contour that is substantially complementary to the non-circular hole 138 in the anchor plate 90 in which the slide bearing 46 seats thereby preventing slide bearing rotation. Such a non-circular hole 138 and substantially complementary non-circular neck 202 also helps properly orient the slide plate receiving channels 165 in a desired seat position adjustment direction, e.g., fore-aft direction, when the neck 202 of a seated slide bearing 46 is received in the hole 138. As is best shown in FIG. 7, each slide bearing receiving hole 138 is generally rectangular formed of two pairs of opposed and generally parallel sides 158 and 162 with the neck 202 of each slide bearing 46 also being generally rectangular.

Each slide plate receiving channel 165 extends in a seat position adjustment direction, e.g., fore-aft direction, when the slide bearing 46 is seated in a corresponding hole 138 in the anchor plate 90. When each slide bearing 46 is slidably engaged with the slide plate 42, part of the slide plate engaging portion 203 of the head 150 is received in one of the guide slots 100 formed in the plate 42 with at least one of the slot-defining side edges 164 of the plate 42 slidably received in a slide plate receiving channel 165 formed in the head 150. Where the head 150 has a pair of channels 165, each slot-defining side edge 164 is received in a corresponding one of the channels 165.

The slide bearing 46 is similar in construction to the slide bearing disclosed in commonly owned U.S. Pat. No. 8,196,887, the entirety of which is hereby expressly incorporated by reference herein, but which lacks snaps with the slide bearing 46 configured so a keeper 50 can engage the head 150 in anchoring the slide bearing 46 in place. Such a slide bearing 46 can similarly be formed by molding, such as by being injection molded of a plastic, such as nylon, preferably nylon 6 or nylon 66. Such a slide bearing 46 can also be formed of other types of plastics, including an acetal, such as DELRIN 100.

When used with a keeper 50, the slide bearing 46 and keeper 50 form a slide bearing assembly 218 that not only provides seat motion guiding slide bearing support during seat position adjustment but which also provides slide bearing support between the seat bottom 48 and slide plate 42. When the head 150 of the slide bearing 46 is received in a corresponding guide slot 100 in the slide plate 42, slidable contact between the head 150 and slot defining edges 164 provides seat motion guiding slide bearing support along a guide slot extending plane generally perpendicular to the slide plate 42 that bisects guide slot 100. When the keeper 50 is attached to the slide bearing head 150, it provides a generally horizontal slide bearing surface 146 between the seat bottom 48 and the slide plate 42 providing slide bearing support along a generally horizontal plane that is generally perpendicular to the guide slot plane.

With reference once again to FIGS. 11-14, a preferred embodiment of the slide bearing 46 is formed of a generally rectangular, generally block or cube shaped, slide puck 154 having a generally rectangular retainer base 148 with the neck 202 of the outwardly extending head 150 being generally rectangular in cross section. The flange 160 of the retainer base 148 extends outwardly beyond the head 150 about the entire periphery of the head 150. The anchor-plate abutting shoulder 161 defined by the flange 160 can be generally flat or planar forming an abutment substantially complementary to a generally flat or planar portion of the side 139 of the anchor plate 90 extending about the hole 138 in which the slide bearing 46 is seated.

The neck 202 of the head 150 is generally rectangular in cross section and slightly smaller in size than the generally rectangular hole 138 in the anchor plate 90 in which the neck 202 is received during seating of the slide bearing 46 in the hole 138 thereby preventing slide bearing rotation In the preferred slide bearing embodiment shown in the drawings, each generally rectangular hole 138 in the anchor plate 90 is elongated in the direction of seat position adjustment, e.g., elongated in a fore-aft direction, with the neck 202 of each slide bearing 46 also elongated in the direction of seat position adjustment, e.g., elongated in a fore-aft direction, such that receipt of the neck 202 in the hole 138 when the slide bearing 46 is seated in the hole 138 desirably orients each slide plate receiving channel 165 in the direction of seat movement during seat position adjustment. As such, the head 150 can also be elongated in the direction of seat movement during seat position adjustment, such as depicted in FIG. 4, when the slide bearing 46 is seated in hole 138 and engaged with the slide plate 42 thereby helping to guide movement of the seat 44 relative to the slide plate 42 in the desired direction, e.g. fore-aft direction, during seat position adjustment.

The slide plate engaging portion 203 of the slide bearing head 150 has a pair of sides 181 and 183 and ends 194 and 196 with a slide plate receiving channel 165 formed in each side 181 and 183 and a retainer engagement channel 200 formed in each end 194 and 196. While the retainer engagement channels 200 can be generally parallel to the slide plate receiving channels 165, a preferred slide bearing embodiment has the retainer engagement channels 200 oriented at an angle relative to the slide plate receiving channels 165. In the preferred slide bearing shown in the drawings, at least one and preferably both retainer engagement channels 200 are oriented generally perpendicular or generally transverse to at least one and preferably both slide plate receiving channels 165. When generally perpendicular oriented, a keeper 50 engaged with the head 150 of a slide bearing 46 will be generally perpendicular oriented relative to the guide slot 100 in which the head 150 is slidably received helping to prevent the keeper 50 from disengaging during seat position adjustment.

In the preferred slide bearing embodiment shown in the drawings, the slide plate receiving channels 165 are generally parallel to one another and formed in respective sides 181 and 183 of the head 150 that can also be generally parallel to one another. In the preferred slide bearing embodiment shown in the drawings, the retainer engagement channels 200 can be and preferably are also parallel to one another. The respective ends 194 and 196 in which each channel 200 is formed can and preferably are also generally parallel to one another.

Each slide plate receiving channel 165 can be elongate and defined by upper and lower shoulders 168 and 170 interconnected by a channel end wall 172 with the upper and lower shoulders 168 and 170 respectively overlying opposite sides 174 and 176 of the slide plate 42 when a corresponding one of the slot defining edges 164 of the plate 42 is received in the channel 165. The upper shoulder 168 is defined by an extension 201 of the neck 202 that extends outwardly beyond the anchor plate 90 when the slide bearing 46 is seated in hole 138 with the extension 201 also providing an abutment surface against which part of the keeper 50 abuts and/or engages during keeper attachment. The lower shoulder 170 is defined by a flange 175 extending along the bottom 151 of the slide bearing head 150. Each retainer engagement channel 200 can also be elongate and is defined by a channel end wall 208 interconnecting upper and lower shoulders 204 and 206 that overlie opposite sides 142 and 144 of the part of keeper 50, i.e., arms 180 and 182, received in the channel 200.

While the slide plate receiving channels 165 are disposed in a common plane, i.e., substantially coplanar, and the retainer engagement channels 200 are disposed in a common plane, i.e., substantially coplanar, the slide plate receiving channels 165 are not disposed in the same plane as the plane of the retainer engagement channels 200. In the preferred slide bearing embodiment shown in the drawings, the slide plate receiving channels 165 are disposed in a first plane that is generally parallel to a second plane in which the retainer engagement channels 200 are disposed. The retainer engagement channels 200 and the plane in which channels 200 are disposed are located closer to the retainer base 148 than the slide plate receiving channels 165 and the plane in which channels 165 lie in order to help position a keeper 50 received in channels 200 between the anchor plate 90 and the slide plate 42. In the preferred slide bearing embodiment shown in the drawings, the retainer engagement channels 200 are located close enough to the retainer base 148 such that the retainer base 148 overlies and abuts against one side 139 of the anchor plate 90 and the keeper 50 underlies and can abut against the other side 141 of the plate 90 substantially immovably anchoring the slide bearing 46 to the plate 90. Where the seat 44 has a seat cover 76 with a bottom panel 78, the keeper 50 captures the bottom panel 78 between the keeper 50 and anchor plate 90 functioning as a retainer, e.g., upholstery retainer, that helps hold the bottom panel 78 of the seat cover 76 against the plate 90. The slide plate receiving channels 165 are disposed between the retainer engagement channels 200 and the end 151 of the head 150 locating a slide plate 42 in slidable engagement with the slide bearing 46 outwardly of both the keeper 50 and the anchor plate 90.

To help minimize the overall height or profile of the seat position adjustment assembly 40, each slide plate receiving channel 165 intersects opposite ends of both retainer engagement channels 200 such that, conversely, each retainer engagement channel 200 intersects opposite ends of both slide plate receiving channels 165. As is best shown in FIGS. 11-14, the upper shoulder 168 of each slide plate receiving channel 165 is disposed interjacent the upper and lower shoulders 204 and 206 of both retainer engagement channels 200 where channel 165 intersects, and the lower shoulder 206 of each retainer engagement channel 200 is disposed interjacent the upper and lower shoulders 168 and 170 of both slide plate receiving channels 165 where channel 200 intersects.

Figure 8:
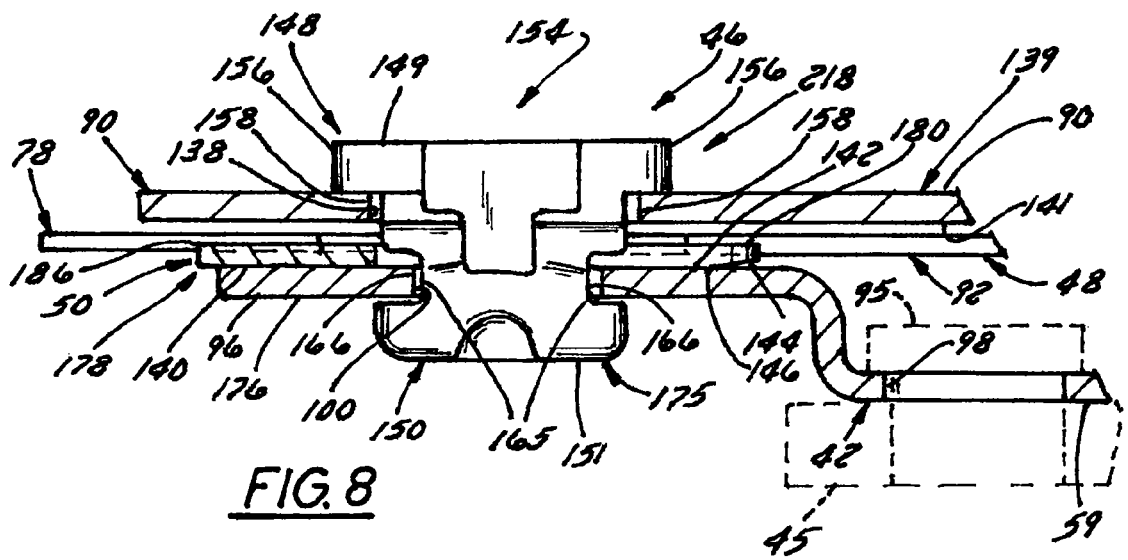
FIG. 8 is a fragmentary cross sectional view of part of the seat position adjustment assembly taken along line 8-8 of FIG. 4 showing a transverse cross section of a keeper engaged with a slide bearing slidably received in a seat position guide slot formed in the slide plate.
Figure 9:
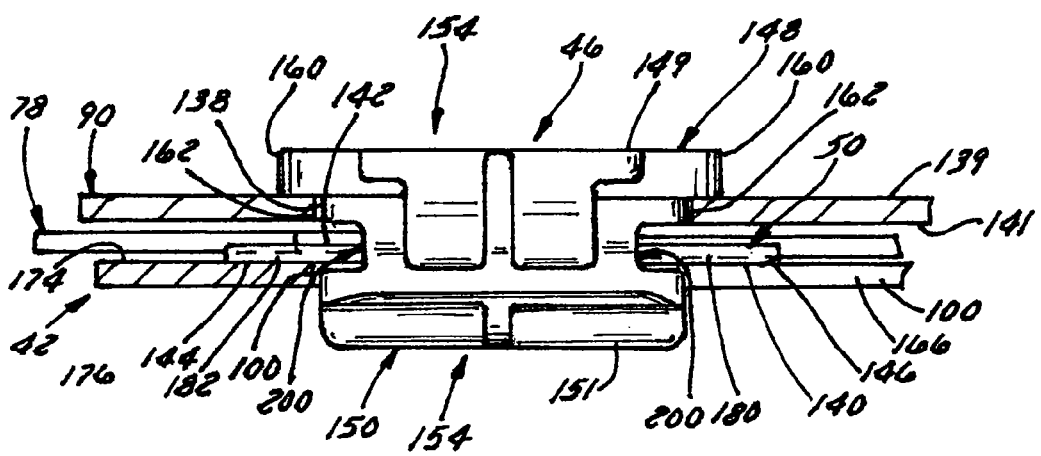
FIG. 9 is a fragmentary cross sectional view of part of the seat position adjustment assembly taken along line 9-9 of FIG. 4 showing a longitudinal cross section of another keeper engaged with another slide bearing slidably received in another seat position guide slot formed in the slide plate.

Such an intersecting channel configuration minimizes seat position adjustment assembly height or profile, which also lowers the seat index point (SIP) of the seat 44, by enabling a relatively thin keeper 50 engaging slide bearing head 150 to be disposed between the seat bottom 48 and slide plate 42, such as is depicted in FIGS. 8-10, with the keeper 50 in contact with both the seat bottom 48 and slide plate 42. Where the seat 44 is equipped with a seat cover 76, the keeper 50 can be received in channels 200 in contact with the seat cover bottom panel 78 and in slidable contact with the slide plate 42, such as is depicted in FIGS. 8-10. Where the seat 44 is not equipped with any seat cover 76 or where the cover 76 lacks a bottom panel 78, a keeper 50 received in channels 200 can be disposed in direct contact with the anchor plate 90 and also be disposed in slidable contact with the slide plate 42.

The keeper 50 engages the part 203 of the head 150 of the slide bearing 46 that extends outwardly from the seat bottom 48 in a manner that securely retains the slide bearing 46 in place substantially immovably anchoring the bearing 46 to the anchor plate 90. In the preferred keeper embodiment shown in the drawing figures, the keeper 50 is configured to frictionally engage the slide bearing head 150 along a plurality of sides of the head 150 in a manner that straddles the head 150. As is best shown in FIGS. 15-18, such a keeper 50 can encompass or encircle a plurality of pairs, i.e., at least three, sides of the slide bearing head 150 when attached to a slide bearing 46.

The keeper 50 is configured to be received in at least one and preferably both retainer engagement channels 200 of the slide bearing 46 to secure the slide bearing 46 to the anchor plate 90 by helping to prevent the slide bearing 46 from being pushed out of the plate 90. Where a seat cushion 66 overlies the anchor plate 90, part of the cushion bottom 81 can also bear against the top 149 of the slide bearing 46 helping to hold the slide bearing 46 down. When the keeper 50 is slidably engaged with the head 150 of the slide bearing 46, it can wedge against the anchor plate 90 of the seat bottom 48 preventing withdrawal of the slide bearing 46 from the hole 138 in the anchor plate 90 while also helping to transfer and spread forces encountered by the slide bearing 46 to the anchor plate 90, and hence the seat bottom 48. Where the keeper 50 is also disposed in slidable contact with the slide plate 42, the keeper 50 also helps transfer forces, including at least some forces encountered by the slide bearing 46, to the slide plate 42.

The preferred embodiment of the keeper 50 is a generally U-shaped retainer clip 178 having a pair of spaced apart arms 180, 182 that extend outwardly from a beam 184 interconnecting the arms 180, 182 that can also function as a handle or grip 186 capable of being grasped and maneuvered to attach or remove the keeper 50. Keeper 50 is relatively thin having a pair of generally flat and generally planar outer surfaces 142 and 144 with whichever surface 144 facing toward the slide plate 42 functioning as a bearing surface 146. Keeper 50 is therefore of reversible construction because either one of its outer surfaces 142 and 144 can face toward the slide plate 42 and function as slide bearing surface 146.

The keeper 50 is formed of a relatively durable and generally rigid material, such as metal or plastic, and can be formed by molding, such as by injection molding or the like. Where made of metal, each keeper 50 can be stamped from a sheet of metal, such as a sheet made of steel, aluminum, or the like. In a preferred embodiment, each keeper 50 is made of plastic, such as nylon, like nylon 6 or nylon 66, or an acetal, such as DELRIN 100. Each keeper 50 is generally flat or planar and can function as a wedge including where each arm 180 and/or 182 frictionally engages one or both shoulders 204, 206 and/or end wall 208 of the retainer engagement channel 200 in which the arm 180, 182 is received.

With reference to FIGS. 15-18, the arms 180 and 182 of the generally U-shaped keeper 50 straddle opposite sides or ends of the head 150 of the slide bearing 46 to which the keeper 50 is attached with the interconnecting beam 184 of the keeper 50 extending alongside another side or end of the head 150 that is disposed between the arms 180 and 182. In the preferred keeper embodiment shown in FIGS. 15-18, the arms 180 and 182 straddle opposite ends 194 and 196 of the slide bearing head 150 when each arm 180 and 182 is slidably received in a corresponding retainer engagement channel 200 formed in the head 150. The beam 184 is disposed alongside one of the sides 181 or 183 of the slide bearing head 150 with the beam 184 of the keeper 50 shown in FIGS. 15-18 extending next to side 181 of head 150.

Each arm 180 and 182 has an inner edge 210 which can be substantially straight and which is generally smooth to facilitate slidable insertion of each arm 180 and 182 into a corresponding retainer engagement channel 200 in the slide bearing head 150 during attachment of the keeper 50 to the slide bearing 46. Each arm 180 and 182 can also include a snap 212 that engages part of the head 150 during attachment to help releasably yet securely retain the keeper 50 on the slide bearing 46. Such a snap 212 can be formed of a hook 214 integrally formed in the inner arm edge 210 at or adjacent the free end of each arm 180 and 182.

Figure 16:
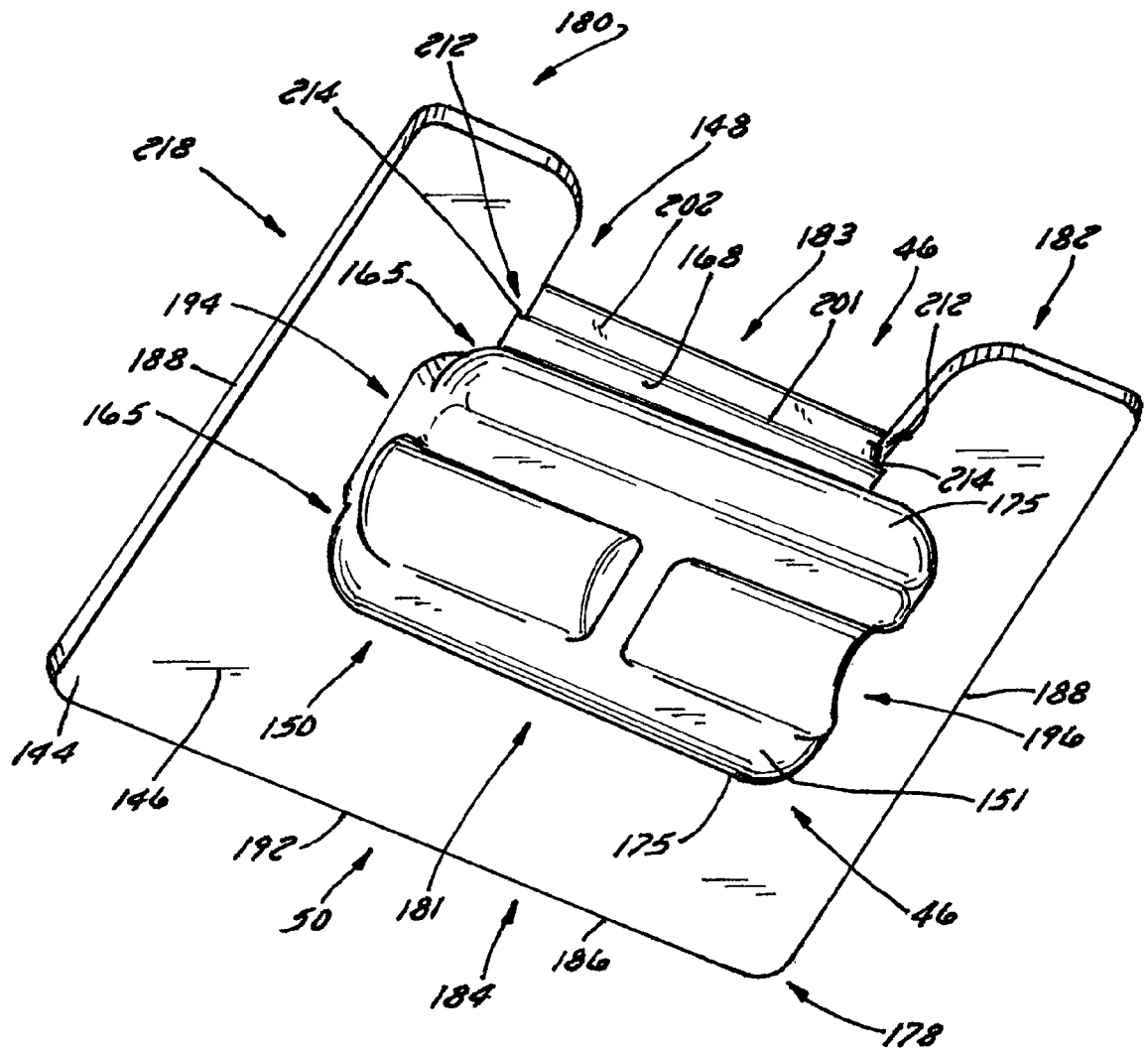
FIG. 16 is a bottom perspective view of the slide bearing assembly of FIG. 15 showing the keeper in snap fit engagement with part of the slide bearing.
Figure 17:
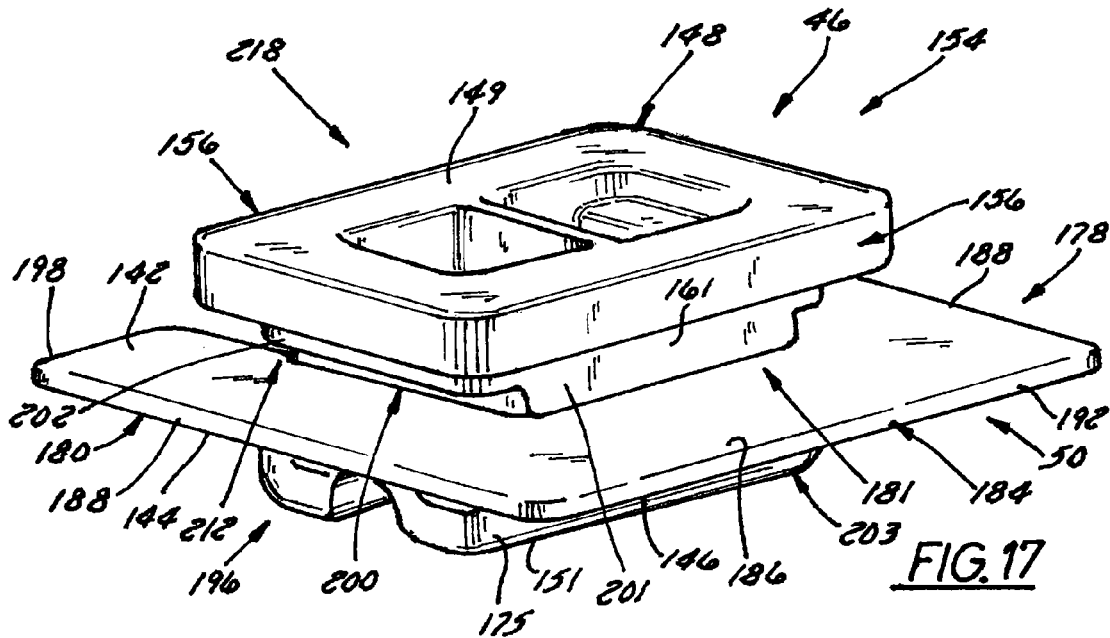
FIG. 17 is a top perspective view of the slide bearing assembly of FIG. 15 showing the keeper attached to the slide bearing.
Figure 18:
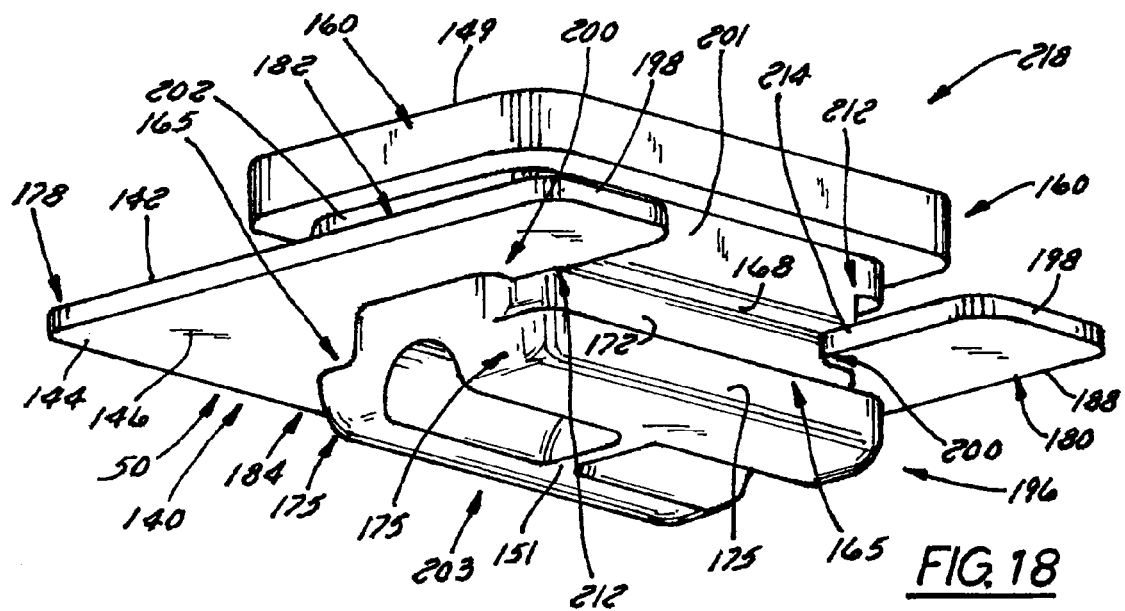
FIG. 18 is a bottom perspective view of the slide bearing assembly of FIG. 15 showing the keeper attached to the slide bearing.

When the keeper 50 is attached, each arm 180 and 182 is received in a corresponding one of the retainer engagement channels 200 formed in opposite ends 194 and 196 of the slide bearing head 150 with the snap 212 of each arm 180 and 182 engaging one side 183 of the head 150. The inner edge 216 of the beam 184 is disposed alongside an opposite side 181 of the head 150. As is best shown in FIGS. 16 and 17, the inner beam edge 216 is disposed alongside the abutment extension 201 of the neck 202 on one side 181 of the slide bearing head 150 and the hook 214 on each arm 180 and 182 each engages the abutment extension 201 of the neck 202 on the opposite side 183 of the head 150 providing snap fit engagement therebetween.

The keeper 50 is advantageously quick and easy to attach to a slide bearing 46. During attachment, the keeper 50 is maneuvered relative to the slide bearing head 150 until each arm 180 and 182 is slidably received in a corresponding channel 200 before urging the keeper 50 toward the head 150 until the beam 184 stops against the abutment 201 on one side 181 and the snap 212 of each arm 180 and 182 clears the abutment 201 on the other side 183. Once each snap 212 clears adjacent abutment 201, the hook 214 of the snap 212 of each arm 180 and 182 releasably hooks against the adjacent abutment 201 preventing unintentional removal of the keeper 50.

The keeper 50 also is advantageously removable enabling relatively simple, quick and inexpensive servicing of the seat 44 to be performed. The keeper 50 is removably attached because the beam 184 can be grasped and pulled away from the slide bearing head 150 with enough force to cause the hook 214 of one or both arms 180 and 182 to cam along the adjacent abutment 201 spreading the arms 180 and 182 apart enough so the keeper 50 can be pulled completely free of the slide bearing head 150. One or both arms 180 and 182 can also flex or bend slightly during such application of keeper removal force to help facilitate removal.

With reference to FIGS. 1-10, a keeper 50 attached to the slide bearing 46 not only extends outwardly of the head 150 with which it is engaged in a direction generally parallel to the anchor plate 90, it also has a foot print that extends outwardly of the outer periphery of the retainer base 148 of the slide bearing 46. Each arm 180 and 182 is generally parallel to the retainer base 148 having an outer edge 188 that not only extends outwardly beyond an adjacent end 194 and 196 of the slide bearing head 150 but also extends outwardly beyond a corresponding adjacent portion of the outer edge 190 of the retainer base 148. The interconnecting beam 184 of the keeper 50 has an outer edge 192 that not only extends outwardly beyond an adjacent side 181 of the head 150 but also extends outwardly beyond a corresponding adjacent portion of the outer edge 190 of the retainer base 148.

Such a keeper construction not only provides greater contact surface area with the anchor plate 90 (and/or with the seat bottom 48 where a cover or layer overlies the anchor plate 90) than between the retainer base 148 and anchor plate 90, it also functions as a spacer disposed between the seat bottom 48 and slide plate 42 having a generally flat or planar bearing surface 146 against which the slide plate 42 can slidably contact. Such a large contact surface area with the anchor plate 90 (and/or with the seat bottom 48 where a seat cover or layer overlies the anchor plate 90), helps the keeper 50 to more securely anchor the slide bearing 46 to the anchor plate 90. Such a large contact surface area also helps transmit and distribute forces encountered by the slide bearing 46 away from the slide bearing 46 and can help reduce forces transmitted by the slide plate 42 to the slide bearing 46.

Where the keeper 50 is disposed in slidable contact with the slide plate 42, such as shown in FIGS. 8-10, such a keeper construction not only also provides a large contact surface area with the slide plate 42 but also functions as a spacer that spaces the slide plate 42 away from the seat bottom 48. Such a large contact surface area with the slide plate 42 not only helps minimize sliding friction between the slide plate 42 and each keeper 50 during fore-aft seat position adjustment, it also advantageously helps more evenly distribute the weight of a seat occupant sitting in the seat 44 through the keepers 50 to the slide plate 42. This not only reduces compressive stresses encountered by each keeper 50, it also helps reduce such stresses encountered by each slide bearing 46, including by helping to transmit such stresses away from and around the slide bearing 46.

With specific reference to FIGS. 8-10, the arrangement of the retainer engagement channels 200 relative to the slide plate receiving channels 165 along with the relatively thin and generally flat construction of the keeper 50 forms a slide bearing assembly 218 used to removably and slidably couple with a slide plate 42 forming a seat position adjustment assembly 40 that also can function as a seat mounting assembly 56 that takes up a minimum of vertical space producing a seat position adjustment assembly 40 of low profile or short height construction. As a result of the retainer engagement channels 200 intersecting the slide plate receiving channels 165 with the lower shoulder 206 of each channel 200 is disposed interjacent the upper and lower shoulders 168 and 170 of each channel 165, such as depicted in FIGS. 11-14, tolerance stack up is minimized enabling the relatively thin keeper 50 to overlie and slidably contact the slide plate 42, such as is depicted in FIGS. 8-10. By minimizing tolerance stack up, profile height is also minimized.

To help minimize profile height, the keeper 50 has a cross sectional thickness no greater than the width of the retainer engagement channel 200 where the retainer engagement channel width is defined as the distance between the upper and lower channel shoulders 204 and 206. With reference to FIG. 10, where the seat bottom 48 includes a cover 76 overlying the anchor plate 90, the keeper 50 has a thickness no greater than about 90% of the width of the retainer engagement channel 200 minus the thickness of a cover 76 overlying the anchor plate 90. In another preferred embodiment the keeper 50 has as thickness no greater than the distance between abutment shoulders 161 and 170 minus the sum of the anchor plate 90 and slide plate 42 thicknesses. With continued reference to FIG. 10, a keeper 50 constructed in accordance with the present invention can have a thickness less than the cross sectional thickness of both the anchor plate 90 and the slide plate 42.

The slide plate 42 is also configured to minimize the profile or height of the seat position adjustment assembly 40 having a mounting section 59 between a pair of seat position adjustment direction extending slide bearing engaging flanges 96, e.g., fore-aft extending slide bearing flanges 96, each having at least one elongate seat position adjustment direction extending guide slot 100, e.g., fore-aft extending guide slot 100, formed therein that slidably receives the head 150 of a corresponding slide bearing 46 when the seat 44 is slidably coupled to the slide plate 42. The mounting section 59, e.g., mount, can be generally flat or planar such as is depicted in FIGS. 1-6 and can include one or more mounting bores 98 configured to receive a fastener, such as a bolt, use to immovably fix the slide plate 42 to the seat mounting platform 45.

In the preferred slide plate embodiment shown in FIGS. 1-6, each flange 96 has a pair of seat position adjustment direction extending guide slots 100 generally aligned with one another in the seat position adjustment direction with each slot 100 having a keyhole slot section 102 wider than the remainder of the slot 100 to enable the head 150 of a corresponding slide bearing 46 to be inserted and slid along the slot 100 into engagement with the slide plate 42. A preferred keyhole 102 is formed by an enlarged generally rectangular slide bearing insertion aperture 104 that is larger than the generally rectangular cross sectional shape of the slide bearing head 150 to enable insertion of the head 150 into the aperture 104.

The slide plate 42 includes an offset 97 between each flange 96 and the mounting section 59 spacing the flanges 96 from the mounting section 59 providing enough clearance between the mounting section 59 and the seat bottom 48 to accommodate a seat position latch arrangement 52 that cooperates with both the anchor plate 90 and slide plate 42 enabling selectively releasable positioning of the seat 44 relative to mounting platform 45. The seat position latch arrangement 52 includes a pivotable latch handle 54 disposed between the anchor plate 90 and slide plate 42 that is biased by a biasing element, such as a coil spring 105, into releasable engagement with the slide plate 42 releasably locking the position of the seat 44 in a desired seat position. If desired, the latch handle 54 can pivotally engage the slide plate 42 and be urged by the spring 105 into releasable seat position locking engagement with the anchor plate 90 in another seat position latch arrangement embodiment.

With additional reference to FIG. 7, in a preferred seat position latching arrangement 52, the anchor plate 90 includes a latch handle seat 106 configured to receive and pivotally retain one end of an elongate latch handle 54 in engagement with the plate 90. The latch handle 54 has a generally flat or planar body 108 with a three dimensionally contoured pivotable guide coupling 110 at one end that is pivotally received in the seat 106 and which can include an integrally formed latch handle grip 112 at the other end. The latch handle 54 is made of a generally rigid material, such as a metal, which can be integrally formed, such as by stamping or the like, to produce a handle 54 of one-piece and unitary construction.

The pivotable guide coupling 110 of the latch handle 54 includes a generally L-shaped tongue 116 having a spacer 118 extending outwardly from the handle body 108 toward the anchor plate 90. The spacer 118 includes an outturned engagement lip 120 extending in a direction generally opposite to the handle body 108 that can be generally parallel to the handle body 108. The coupling 110 includes at least one guide tab 122 and preferably a pair of generally parallel guide tabs 122 transverse to spacer 118 that each extend outwardly from the handle body 108 toward the anchor plate 90.

Where the anchor plate 90 is covered by a seat cover 76, the cover 76 includes a latch handle seat window 114 exposing the latch handle seat 106 enabling attachment of the latch handle 54 to the anchor plate 90. The seat 106 includes a latch handle pivot slot 124 generally transverse to the seat position adjustment direction, e.g., fore-aft direction, that pivotally receives outturned lip 120 and part of spacer 118 in pivotally attaching the handle 54 to the anchor plate 90. The seat 106 also includes at least one latch handle guide slot 126 formed in the anchor plate 90 that is generally oriented in the seat position adjustment direction, e.g., fore-aft direction, which receives a guide tab 122 of the handle 54 when pivotally attached to the anchor plate 90. A preferred seat 106 has a pair of generally parallel guide slots 126 that receive a corresponding latch handle guide tab 122 constraining pivotal movement of the handle 54 relative to the anchor plate 90 toward or away from the plate 90 while transferring lateral forces encountered by the handle 54 to the plate 90 providing lateral latch handle support.

The latch handle seat 106 includes a spring land 128 disposed between the latch handle guide slots 126 alongside the latch handle pivot slot 124 capturing the spring 105 between the land 128 and the latch handle 54 when the handle 54 is pivotally attached to the anchor plate 90. A spring anchor 132, such as in the form of a rivet, can be used to fix one end of the spring 105 to a portion of the latch handle 54 between its guide tabs 122 with the other end of the spring 105 bearing against the spring land 128 when the handle 54 is pivotally engaged with the anchor plate 90.

To releasably engage the slide plate 42 to releasably retain the seat 44 in a desired seat adjustment position, the latch handle 54 has a plurality of spaced apart and generally parallel slide plate engaging teeth 134 extending outwardly in a direction opposite the guide tabs 122. As is best shown in FIG. 7, each tooth 134 is disposed inboard and generally parallel to an adjacent guide tab 122 with the spring 105 fixed by the spring anchor 132 to the latch handle 54 between the teeth 134.

As is best shown in FIGS. 1-5, the teeth 134 of the latch handle 54 are each receivable in one of a plurality of spaced apart and generally parallel seat position apertures 136a, 136b and 136c formed in the mounting section 59 of the slide plate 42. In the preferred seat position latching arrangement 52 shown in FIGS. 1-5, the mount section 59 of the slide plate 42 has three pairs of fore-aft spaced apart seat position apertures 136a, 136b and 136c enabling the seat 44 to be releasably retained in one of a plurality of fore-aft seat adjustment positions.

In changing seat position, a seat occupant sitting in the seat 44 can reach down and lift the latch handle 54 upwardly disengaging its teeth 134 from the slide plate 42 enabling the seat 44 to be moved relative to the slide plate 42 between one of a plurality of pairs, i.e., at least three, seat positions. During seat movement, stop 93 limits seat movement in one seat position adjustment direction by abutting against one end of one of the guide slots 100 in the enlarged keyhole 102 of the slot 100 and the slide bearings 46 limit seat movement in an opposite seat position adjustment direction by abutting against an opposite end of each slot 100. When the seat 44 is moved to a desired position, the handle 54 is released causing the spring 105 to urge the teeth 134 into one of the plurality of pairs, i.e., at least three, of apertures 136a, 136b and 136c in the slide plate 42.

With reference to FIG. 2, when the handle 54 is lifted, it rotates about a pivot formed by pivotable engagement between its tongue 116 received in pivot slot 124 of the anchor plate 90 and the anchor plate 90 causing the teeth 134 to be withdrawn from one set of seat position apertures 136c, enabling the seat 44 to be moved relative to the slide plate 42 in a forward direction relative to a front of the vehicle in which the seat 44 is mounted. When the seat 44 is moved to a desired position, such as the more forward seat position shown in FIG. 3, the handle 54 is released, causing the spring 105 to urge the handle 54 toward the slide plate 42 causing the teeth 134 to be received in one of the other sets of seat position apertures 136a or 136b. The same procedure is used to move the seat 44 relative to the slide plate 42 rearwardly toward a rear of the vehicle in which the seat 44 is mounted.

During assembly of a seat position adjustment assembly 40 constructed in accordance with the present invention, a slide bearing 46 is inserted "head first" into each hole 138 in an anchor plate 90 that has been attached to the seat frame 62. The head 150 of each slide bearing 46 is inserted into its hole 138 until the retainer base 148 abuts against one side 139 of the anchor plate 90 and the head 150 extends outwardly from the hole 138 beyond the other side 141 of the plate 90.

Where the seat 44 includes a separate seat cushion, e.g., a foam seat cushion, the seat cushion 66 is assembled to the seat frame 62 with its channels 86 and 88 receiving and frictionally engaging corresponding frame tubes 82 and 84. When the cushion 66 is attached to the frame 62, its bottom 81 faces toward and can rest on the anchor plate 90 having clearance pockets 83 overlying the retainer base 148 of each slide bearing 46 mounted to the plate 90, such as is shown in FIG. 5. The cushion bottom 81 can also include a clearance pockets 85 disposed between pockets 83 to provide sufficient clearance to accommodate the lip 120 and guide tabs 122 of a seat position latch handle 54 pivotally engaged with the anchor plate 90.

Where the seat 44 further includes a separate backrest cushion, e.g., a foam backrest cushion, the backrest cushion 70 is attached to the seat frame 62 in a similar manner with channels formed in the cushion 70 that receive and frictionally engage a corresponding frame tubes (not shown) of the frame 62. Where the seat 44 includes a seat cover 76, the cover 76 can be secured to the backrest cushion 70 and can include a form-fitting shroud 63 that fits over the seat cushion 66 having a bottom panel 78 overlapping the outside 141 of the anchor plate 90.

When all of the slide bearings 46 are seated in the anchor plate 90, a keeper 50 is removably attached to the head 150 of each slide bearing 46. In doing so, each keeper 50 is grasped and maneuvered so its arms 180 and 182 are received in a respective retainer engagement channel 200 of the head 150 of each slide bearing 46. Each keeper 50 is then urged toward the head 150 until its beam 184 contacts the abutment 201 on one side 181 or 183 of the head 150 and the hook 212 on each arm 180 and 182 each engages the abutment 201 on the other side 181 or 183 of the head 150.

When attached, each keeper 50 anchors the corresponding slide bearing 46 engaged by the keeper 50 to the anchor plate 90 with its arms 180 and 182 oriented generally transverse to the slide plate receiving channels 165 to prevent the keeper 50 from disengaging during seat position adjustment. Where the seat 44 includes a seat cover 76 with a bottom panel 78 overlapping the outside 141 of the anchor plate 90, each keeper 50 also functions as an upholstery retainer clip 178 that helps hold the bottom panel 78 against the outside 141 of the anchor plate 90.

In one embodiment, the seat cover 76 can include a form-fitting shroud 63 that fits over a seat cushion 66 disposed on the anchor plate 90 with the shroud 63 having a bottom panel 78 held in place against the anchor plate 90 by keepers 50 attached to slide bearings 46. In another embodiment, the keepers 50 anchor slide bearings 46 to an anchor plate 90 while also helping to hold a separate bottom panel 78 against the plate 90 before attaching the anchor plate 90 to part of the seat 44, such as by attaching the plate 90 to part of the seat frame 62, forming the seat bottom 48. If desired, one or more upholstery retainer clips 94 such as Christmas tree clips, can also be used between the keepers 50 to help hold the bottom panel 78 against the anchor plate 90.

Once the keepers 50 are attached, the seat 44 is maneuvered to insert the head 150 of each slide bearing 46 into the enlarged keyhole 102 of a corresponding guide slot 100 in the slide plate 42. When the head 150 each slide bearing 46 is received in the keyhole 102 of a corresponding slot 100, the seat 44 is then moved relative to the slide plate 42 to urge the head 150 of each slide bearing 46 along its corresponding guide slot 100 into slidable engagement with the slide plate 42 removably mounting the seat 44 to the slide plate 42. As the seat 44 is moved relative to the slide plate 42, the opposed edges 164 defining each slot 100 are slidably received in a corresponding slide plate receiving channel 165 of the head 150 of a respective slide bearing 46 causing the head 150 of each slide bearing 46 to slidably engage the slide plate 42.

Where the slide plate 42 is immovably fixed to a mounting platform 45 beforehand, the seat 44 can be removably mounted to the slide plate 42 without having to install fasteners from the seat bottom 48. During installation, the seat 44 is simply dropped onto the slide plate 42 and maneuvered to slidably engage the slide bearings 46 with the slide plate 42 before releasing the latch handle 54 so it releasably engages the slide plate 42 releasably locking the position of the seat 44.

Where equipped with a limiter 91, a stop 93 is removably attached to the limiter 91 in a manner that positions the stop 93 within one of the guide slots 100 between the head 150 of the slide bearing 46 received in the slot 100 and an end of the slot 100 that forms part of the slot keyhole 102. When the stop 93 is attached to the limiter 91 and disposed between head 150 and the end of the slot keyhole 102, abutment of the stop 93 against the end of the slot keyhole 102 prevents the head 150 of each slide bearing 46 from re-entering the keyhole 102 preventing detachment of the seat 44 from the slide plate 42.

A seat position adjustment assembly 40 constructed in accordance with the present invention advantageously employs non-metallic slide bearings 46 that do not rust removably anchored to the slide plate 90 by non-metallic keepers 50 that also do not rust. Such a non-rusting slide bearing assembly 218 advantageously helps prevent both the anchor plate 90 and the slide plate 42 from rusting by isolating and/or electrically insulating the plates 42 and 90 from one another. In addition, in contrast to conventional interlocking metallic seat slide assemblies, the plastic head 150 of each slide bearing 46 slidably received in a corresponding guide slot 100 formed in the slide plate 42 advantageously forms a self-cleaning seat position adjustment assembly 40 that prevents the accumulation of dirt and debris during use and operation.

Such a seat position adjustment assembly 40 is not only more economical than conventional interlocking metallic seat slide assemblies; it also is easier and more economical to service. Disassembly is not only easier, it is also faster with detachment of a seat 44 from the slide plate 42 only requiring removal of any stop 93 before the seat 44 is moved relative to the slide plate 42 until the head 150 of each slide bearing 46 reaches the keyhole section 102 of its respective slot 100 and then lifted upwardly from the slide plate 42. Seat removal can therefore advantageously be done without removing the slide plate 42. Removal or replacement of other parts of the seat 44, such as the seat cushion 66, the seat cover 76, e.g., bottom panel 78, one or more slide bearings 46, and/or frame 62, is also simple, quick and economical requiring removal of the latch handle 54 and each keeper 50.

When servicing is finished, the keepers 50 and latch handle 54 are reattached before the seat 44 is dropped down onto the slide plate 42 with its slide bearings 46 each in registry with the keyhole section 102 of a corresponding guide slot 100. The latch handle 54 is released and the seat 44 moved relative to the slide plate 42 until the head 150 of each slide bearing 46 is received in its respective guide slot 100 and the handle 54 engages the slide plate 42 before any stop 93 is reattached.

While the preferred embodiment of the seat position adjustment assembly 40 shown in the drawing figures is configured to permit selective adjustment of the position of the seat 44 in a fore-aft direction, it should be recognized that a seat position adjustment assembly 40 constructed in accordance with the present invention could be configured to allow selective adjustment of the position of the seat 44 in a different seat position adjustment direction. For example, a seat position adjustment assembly 40 constructed in accordance with the present invention could be configured to permit seat position adjustment in a direction generally perpendicular or transverse to the fore-aft direction or in a sideways direction, if desired.

Understandably, the present invention has been described above in terms of one or more preferred embodiments and methods. It is recognized that various alternatives and modifications may be made to these embodiments and methods which are within the scope of the present invention. Various alternatives are contemplated as being within the scope of the present invention. It is also to be understood that, although the foregoing description and drawings describe and illustrate in detail one or more preferred embodiments of the present invention, to those skilled in the art to which the present invention relates, the present disclosure will suggest many modifications and constructions, as well as widely differing embodiments and applications without thereby departing from the spirit and scope of the invention.

What is claimed is:

1. A seat position adjustment assembly comprising:
   an anchor plate;
   a slide bearing extending outwardly from the anchor plate; and
   a slide plate movable relative to the anchor plate and slide bearing, the slide plate having an elongate seat position guide slot formed therein slidably receiving part of the slide bearing, the slide plate in slidable contact with the slide bearing; and
   a slide bearing keeper removably engaging the slide bearing removably attaching the slide bearing to the anchor plate; and
   wherein the slide bearing keeper is disposed between the anchor plate and the slide plate, the slide bearing keeper underlying the anchor plate and overlying the slide plate.

2. The seat position adjustment assembly of claim 1 wherein the guide slot formed in the slide plate is defined by a pair of opposed slot defining edges and wherein the slide bearing comprises a slide plate receiving channel that receives one of the slot defining edges of the slide plate when the head is slidably received in the guide slot.

3. The seat position adjustment assembly of claim 2 wherein the anchor plate has a hole formed therein and wherein the slide bearing comprises a retainer base from which a head extends outwardly with the retainer base abutting against one side of the anchor plate and the head extending through the hole outwardly beyond the other side of the anchor plate.

4. The seat position adjustment assembly of claim 3 wherein the hole is elongate and has a non-circular shape, and wherein a part of the head disposed in the hole is elongate and has a generally non-circular cross section substantially complementary to the non-circular shape of the hole preventing rotation of the slide bearing relative to the anchor plate.

5. The seat position adjustment assembly of claim 4 wherein the hole is generally rectangular and wherein the part of the head received in the hole has a generally rectangular cross section substantially complementary to the generally rectangular shape of the hole.

6. The seat position adjustment assembly of claim 4 wherein a part of the head extending outwardly from the hole is elongated in a direction of seat position adjustment.

7. The seat position adjustment assembly of claim 6 wherein the part of the head extending outwardly from the hole is elongated in a fore-aft direction.

8. A seat position adjustment assembly comprising:
   an anchor plate having an elongate hole formed therein that is elongated in a fore-aft direction of seat position adjustment;

a slide bearing having a slide plate receiving channel formed therein, a retainer base abutting against one side of the anchor plate, and a head extending outwardly from the retainer base with the head received in the elongate hole in the anchor plate and having part of the head extending outwardly from the anchor plate, the head elongated in the fore-aft direction of seat position adjustment preventing rotation of the slide bearing relative to the anchor plate; and a slide plate having an elongate seat position guide slot formed therein defined by a pair of opposed slot defining edges, the seat position guide slot slidably receiving part of the slide bearing with one of the slot defining edges received in the slide plate receiving channel in the slide bearing; and wherein a part of the head extending outwardly from the hole is elongated in a direction generally parallel to the slide plate receiving channel.

9. The seat position adjustment assembly of claim 8 further comprising a slide bearing keeper engaging the slide bearing releasably attaching the slide bearing to the anchor plate.

10. The seat position adjustment assembly of claim 9 wherein the slide bearing keeper is configured to produce snap fit engagement with the slide bearing.

11. The seat position adjustment assembly of claim 9 wherein the slide bearing keeper straddles the slide bearing.

12. The seat position adjustment assembly of claim 9 wherein the slide bearing keeper is disposed between the anchor plate and the slide plate.

13. The seat position adjustment assembly of claim 12 wherein the anchor plate comprises a seat bottom.

14. The seat position adjustment assembly of claim 12 wherein the slide bearing keeper comprises a spacer that spaces the slide plate from the anchor plate.

15. The seat position adjustment assembly of claim 12 wherein the slide bearing keeper (a) is generally parallel to the anchor plate and the slide plate, and (b) comprises a bearing surface against which the slide plate slidably contacts.

16. The seat position adjustment assembly of claim 12 further comprising a layer of upholstery disposed against the anchor plate and wherein the slide bearing keeper engages the slide bearing between the layer of upholstery and the slide plate comprising an upholstery retainer clip holding the layer of upholstery against the anchor plate.

17. The seat position adjustment assembly of claim 8 wherein the slide bearing comprises a retainer base abutting against one side of the anchor plate and a head extending outwardly from the retainer base through the hole outwardly beyond the other side of the anchor plate and further comprising a slide bearing keeper disposed between the anchor plate and slide plate engaging the head anchoring the slide bearing to the anchor plate.

18. The seat position adjustment assembly of claim 8 further comprising a slide bearing keeper engaging the slide bearing, wherein the guide slot formed in the slide plate is defined by a pair of opposed slot defining edges, wherein the slide bearing has an elongate slide plate receiving channel formed therein receiving one of the slot defining edges of the slide plate, and wherein the slide bearing has a retainer engagement channel formed therein that receives part of the slide bearing keeper.

19. The seat position adjustment assembly of claim 18 wherein the slide plate receiving channel is disposed at an angle relative to the retainer engagement channel.

20. The seat position adjustment assembly of claim 19 wherein the slide plate receiving channel is generally transverse to the retainer engagement channel.

21. The seat position adjustment assembly of claim 18 wherein the slide bearing has a pair of generally parallel retainer engagement channels and the slide bearing keeper straddles the slide bearing having one portion received in one of the retainer engagement channels and having another portion received in the other one of the retainer engagement channels.

22. The seat position adjustment assembly of claim 21 wherein the slide bearing keeper has a pair of spaced apart and generally parallel arms with one of the arms received in one of the retainer engagement channels and the other one of the arms received in the other one of the retainer engagement channels.

23. A slide bearing for a seat position adjustment assembly comprising: (a) a seat bottom from which the slide bearing extends outwardly slidably engaging a slide plate, the slide bearing comprising a head having an elongate slide plate receiving channel formed therein, and (b) a slide bearing keeper in releasable engagement with the head of the slide bearing, the slide bearing keeper straddling the head of the slide bearing.

24. The slide bearing of claim 23 wherein the slide bearing keeper is disposed between the seat bottom and the slide plate.

25. The slide bearing of claim 24 wherein the slide bearing keeper comprises a generally U-shaped retainer clip.

26. The slide bearing of claim 25 wherein the slide bearing keeper is configured for snap fit engagement with the head of the slide bearing.

27. The slide bearing of claim 24 wherein the head of the slide bearing has a retainer engagement channel formed therein disposed at an angle to the slide plate receiving channel and wherein part of the slide bearing keeper is received in the retainer engagement channel.

28. The slide bearing of claim 27 wherein the retainer engagement channel is generally perpendicular to the slide plate receiving channel.

29. The slide bearing of claim 28 wherein the slide bearing keeper comprises a generally planar retainer clip configured for snap fit engagement with the head of the slide bearing, the retainer clip having a portion received in the retainer engagement channel, the portion of the retainer clip received in the retainer engagement channel generally perpendicular to a direction of seat position adjustment.

30. The slide bearing of claim 23 wherein the head of the slide bearing has a pair of spaced apart retainer engagement channels formed therein disposed at an angle to the slide plate receiving channel and wherein one portion of the slide bearing keeper is received in one of the retainer engagement channels and another portion of the slide bearing keeper is received in the other one of the retainer engagement channels.

31. The slide bearing of claim 30 wherein the slide bearing keeper is configured for snap fit engagement with the head of the slide bearing, the slide bearing keeper comprising a plastic generally planar U-shaped retainer clip having a pair of spaced apart arms extending outwardly from an interconnecting beam, each arm received in a corresponding one of the retainer engagement channels formed in the head of the slide bearing releasably attaching the slide bearing to the seat bottom.

32. The slide bearing of claim 23 wherein the head is elongated in a direction generally parallel to the slide plate receiving channel.

33. The slide bearing of claim 32 wherein the head has a pair of elongate, spaced apart, elongate, and generally parallel slide plate receiving channels formed therein that each extend generally parallel to the slide plate receiving channel.

34. The slide bearing of claim 33 wherein the head is elongated generally in a fore-aft direction and the slide plate receiving channel extends generally in a fore-aft direction.

35. A seat position adjustment assembly comprising:
- an anchor plate having a plurality of spaced apart openings formed therein;
- a plurality of slide bearings, each slide bearing extending outwardly from a corresponding hole in the anchor plate;
- a slide plate having a plurality of elongate seat position guide slots formed therein each slidably receiving a corresponding slide bearing; and
- a plurality of slide bearing keepers, each slide bearing keeper engaging a corresponding slide bearing between the anchor plate and the slide plate spacing the slide plate from the anchor plate while attaching a corresponding one of the slide bearings to the anchor plate, the slide bearing keeper providing a bearing surface between the anchor plate and slide plate that is generally perpendicular to the corresponding one of the slide bearings engaged by the slide keeper.

36. The seat position adjustment assembly of claim 35 wherein each slide bearing keeper snaps onto the corresponding slide bearing.

37. The seat position adjustment assembly of claim 36 wherein each slide bearing keeper straddles the corresponding slide bearing.

38. The seat position adjustment assembly of claim 35 wherein each slide bearing keeper comprises a retainer clip, the bearing surface of each slide bearing keeper being a substantially flat surface facing toward the slide plate against which the slide plate is slidably supported during seat position adjustment.

39. The seat position adjustment assembly of claim 38 wherein each retainer clip is generally U-shaped straddling a portion of the corresponding one of the slide bearings attached thereby to the anchor plate.

40. The seat position adjustment assembly of claim 39 wherein each retainer clip is comprised of plastic, wherein each plastic retainer clip is configured for releasable snap-fit engagement with the portion of the corresponding one of the slide bearings attached thereby to the anchor plate, and wherein the anchor plate comprises a seat bottom.

* * * * *